(12) United States Patent
Petrakis

(10) Patent No.: US 7,287,485 B2
(45) Date of Patent: Oct. 30, 2007

(54) TEMPERATURE ACTIVATED SYSTEMS

(76) Inventor: Dennis N. Petrakis, 2730 Bryant St., Palo Alto, CA (US) 94306

( * ) Notice: Subject to any disclaimer, the term of this patent is extended or adjusted under 35 U.S.C. 154(b) by 0 days.

(21) Appl. No.: 11/436,612

(22) Filed: May 19, 2006

(65) Prior Publication Data

US 2006/0207495 A1    Sep. 21, 2006

Related U.S. Application Data

(63) Continuation of application No. 10/744,768, filed on Dec. 22, 2003, now Pat. No. 7,048,730, which is a continuation of application No. 09/815,643, filed on Mar. 23, 2001, now Pat. No. 6,682,521.

(60) Provisional application No. 60/191,703, filed on Mar. 23, 2000.

(51) Int. Cl.
*G01K 5/48* (2006.01)
*G01K 5/00* (2006.01)

(52) U.S. Cl. ............ 116/216; 116/221; 374/106; 374/205

(58) Field of Classification Search .......... 116/216, 116/221; 374/102, 104, 105, 106, 187, 205, 374/206; 222/54, 541.2, 541.3, 541.4, 541.5, 222/541.6; 604/890.1, 891.1
See application file for complete search history.

(56) References Cited

U.S. PATENT DOCUMENTS

| 1,622,545 | A | 3/1927 | Schellenberger |
| 1,625,014 | A | 4/1927 | Amodio |
| 2,125,419 | A | 8/1938 | Birk |
| 2,460,215 | A | 1/1949 | Chase |
| 2,601,440 | A | 6/1952 | Kerrigan ............... 116/203 |
| 2,866,338 | A | 12/1958 | Muncheryan |
| 2,953,921 | A | 9/1960 | Muncheryan |
| 2,966,261 | A | 12/1960 | Bradbury |
| 3,214,278 | A | 10/1965 | Mylo |
| 3,291,617 | A | 12/1966 | Barker et al. |
| 3,440,997 | A | 4/1969 | Rogen et al. |

(Continued)

FOREIGN PATENT DOCUMENTS

FR    2619731    9/1987

(Continued)

OTHER PUBLICATIONS

Reynaerts et al., "An implantable drug-delivery system based on shape memory alloy micro-actuation," Sensors and Actuators A 61 (1997) p. 455-462.

(Continued)

*Primary Examiner*—R. Alexander Smith
(74) *Attorney, Agent, or Firm*—Richard C. Litman

(57) ABSTRACT

A shape memory material activated device of the present invention uses a shape memory material activator to create a path through a shell wall of the device. The path through the shell wall may release a substance contained in the shell or allow a substance to enter the shell. The path may be created by fracturing, puncturing, exploding, imploding, peeling, tearing, stretching, separating, debonding or otherwise opening the shell. The devices according to the present invention may be used as temperature sensors or warning devices, drug delivery devices, and the like.

12 Claims, 12 Drawing Sheets

U.S. PATENT DOCUMENTS

| | | | |
|---|---|---|---|
| 3,483,752 A | 12/1969 | Rogen et al. | |
| 3,516,082 A | 6/1970 | Cooper | |
| 3,559,839 A | 2/1971 | Seethaler | |
| 3,659,600 A | 5/1972 | Merrill | 604/891.1 |
| 3,734,348 A | 5/1973 | White | |
| 4,114,559 A | 9/1978 | Rogen | |
| 4,148,748 A * | 4/1979 | Hanlon et al. | 252/408.1 |
| 4,165,359 A | 8/1979 | Thomas et al. | |
| 4,239,040 A | 12/1980 | Hosoya et al. | 604/135 |
| 4,280,361 A | 7/1981 | Sala | |
| 4,425,117 A | 1/1984 | Hugemann et al. | 604/244 |
| 4,439,197 A | 3/1984 | Honda et al. | |
| 4,481,952 A | 11/1984 | Pawelec | 600/582 |
| 4,507,115 A | 3/1985 | Kambara et al. | |
| 4,522,147 A | 6/1985 | Kroll et al. | |
| 4,539,929 A | 9/1985 | Sestak et al. | |
| 4,564,363 A | 1/1986 | Bagnall et al. | 604/891.1 |
| 4,627,850 A | 12/1986 | Deters et al. | 604/892.1 |
| 4,664,056 A | 5/1987 | Jehanno | |
| 4,872,584 A | 10/1989 | Sakai | |
| 4,896,728 A | 1/1990 | Wolff et al. | |
| 4,950,258 A | 8/1990 | Kawai et al. | 604/530 |
| 5,018,874 A * | 5/1991 | Weynant nee Girones | 374/205 |
| 5,045,064 A | 9/1991 | Idriss | 604/132 |
| 5,076,197 A | 12/1991 | Darringer et al. | |
| 5,119,555 A | 6/1992 | Johnson | |
| 5,143,453 A * | 9/1992 | Weynant nee Girones | 374/205 |
| 5,147,351 A | 9/1992 | Wagner | |
| 5,167,626 A | 12/1992 | Casper et al. | |
| 5,170,801 A | 12/1992 | Casper et al. | 600/582 |
| 5,176,275 A | 1/1993 | Bowie | |
| 5,196,002 A | 3/1993 | Hanover et al. | 604/891.1 |
| 5,207,666 A | 5/1993 | Idriss et al. | 604/891.1 |
| 5,217,449 A | 6/1993 | Yuda et al. | 604/890.1 |
| 5,245,738 A | 9/1993 | Johnson | |
| 5,279,607 A | 1/1994 | Schentag et al. | 604/890.1 |
| 5,335,994 A | 8/1994 | Weynant nee Girones | |
| 5,405,614 A | 4/1995 | D'Angelo et al. | 424/449 |
| 5,443,851 A | 8/1995 | Christie et al. | |
| 5,460,117 A | 10/1995 | Loustaunau | |
| 5,487,484 A | 1/1996 | Bonniau et al. | |
| 5,531,180 A | 7/1996 | Bianchini | |
| 5,618,269 A | 4/1997 | Jacobsen et al. | 604/118 |
| 5,626,581 A | 5/1997 | Staehlin et al. | |
| 5,662,587 A | 9/1997 | Grundfest et al. | |
| 5,735,607 A | 4/1998 | Shahinpoor et al. | |
| 5,771,742 A | 6/1998 | Bokaie et al. | |
| 5,821,664 A | 10/1998 | Shahinpoor | 310/307 |
| 5,831,417 A | 11/1998 | Chu | 322/1 |
| 5,843,700 A | 12/1998 | Kerrod et al. | |
| 6,048,337 A | 4/2000 | Svedman | 604/313 |
| 6,082,153 A | 7/2000 | Schoell et al. | 70/1.5 |
| 6,200,317 B1 | 3/2001 | Aalsma et al. | |
| 6,375,638 B2 | 4/2002 | Nason et al. | 604/132 |
| 6,425,343 B1 * | 7/2002 | Akers et al. | 116/216 |
| 6,454,759 B2 | 9/2002 | Krulevitch et al. | 604/891.1 |
| 6,612,739 B2 | 9/2003 | Shahinpoor | |
| 6,648,814 B2 | 11/2003 | Kim et al. | |
| 6,656,158 B2 | 12/2003 | Mahoney et al. | 604/131 |
| 6,656,159 B2 | 12/2003 | Flaherty | 604/131 |
| 6,688,828 B1 | 2/2004 | Post | 411/383 |
| 6,702,734 B2 | 3/2004 | Kim et al. | |
| 6,723,072 B2 | 4/2004 | Flaherty et al. | 604/131 |
| 6,802,811 B1 | 10/2004 | Slepian | 600/309 |
| 6,837,620 B2 | 1/2005 | Shahinpoor | |
| 6,911,004 B2 | 6/2005 | Kim et al. | |
| 6,928,812 B2 | 8/2005 | Donakowski et al. | |
| 6,953,455 B2 | 10/2005 | Cho et al. | |
| 6,960,192 B1 | 11/2005 | Flaherty et al. | |
| 7,018,360 B2 | 3/2006 | Flaherty et al. | |
| 7,048,730 B2 * | 5/2006 | Petrakis | 604/890.1 |
| 2001/0016710 A1 * | 8/2001 | Nason et al. | 604/153 |
| 2002/0055717 A1 | 5/2002 | Poncet | |
| 2002/0161328 A1 | 10/2002 | Rogers | 604/67 |
| 2003/0065250 A1 | 4/2003 | Chiel et al. | |
| 2003/0128491 A1 | 7/2003 | Ruiz et al. | |
| 2003/0216622 A1 | 11/2003 | Meron et al. | |
| 2004/0024382 A1 * | 2/2004 | Cho et al. | 604/891.1 |
| 2004/0115067 A1 | 6/2004 | Rush et al. | 417/322 |
| 2005/0055014 A1 | 3/2005 | Coppeta et al. | |
| 2005/0105587 A1 | 5/2005 | Shahinpoor | |
| 2005/0160858 A1 | 7/2005 | Mernoe | |
| 2005/0186273 A1 | 8/2005 | Yum et al. | |
| 2005/0192561 A1 | 9/2005 | Mernoe | |
| 2005/0235732 A1 | 10/2005 | Rush | |

FOREIGN PATENT DOCUMENTS

| | | | |
|---|---|---|---|
| GB | 2290467 | | 1/1996 |
| JP | 58135808 | | 8/1983 |
| JP | 58194809 | | 11/1983 |
| JP | 60-209-673 | | 10/1985 |
| JP | 62-212-877 | | 6/1987 |
| JP | 1080775 | | 3/1989 |
| JP | 1188799 | | 7/1989 |
| JP | 02161326 A | * | 6/1990 |
| JP | 3100376 | | 4/1991 |
| JP | 5221468 | | 8/1993 |
| JP | 5221469 | | 8/1993 |
| JP | 08007116 B2 | * | 1/1996 |
| JP | 08310562 A | * | 11/1996 |
| JP | 09313520 A | * | 12/1997 |
| JP | 2004257274 | | 9/2004 |
| JP | 2004278495 | | 10/2004 |
| WO | WO 9417379 A1 | * | 8/1994 |

OTHER PUBLICATIONS

Reynaerts et al., "A SMA-Activated Implantable System For Delivery Of Liquid Drugs," Actuator 96, 5th International Conference on New Actuators, Jun. 26-28, 1996.

* cited by examiner

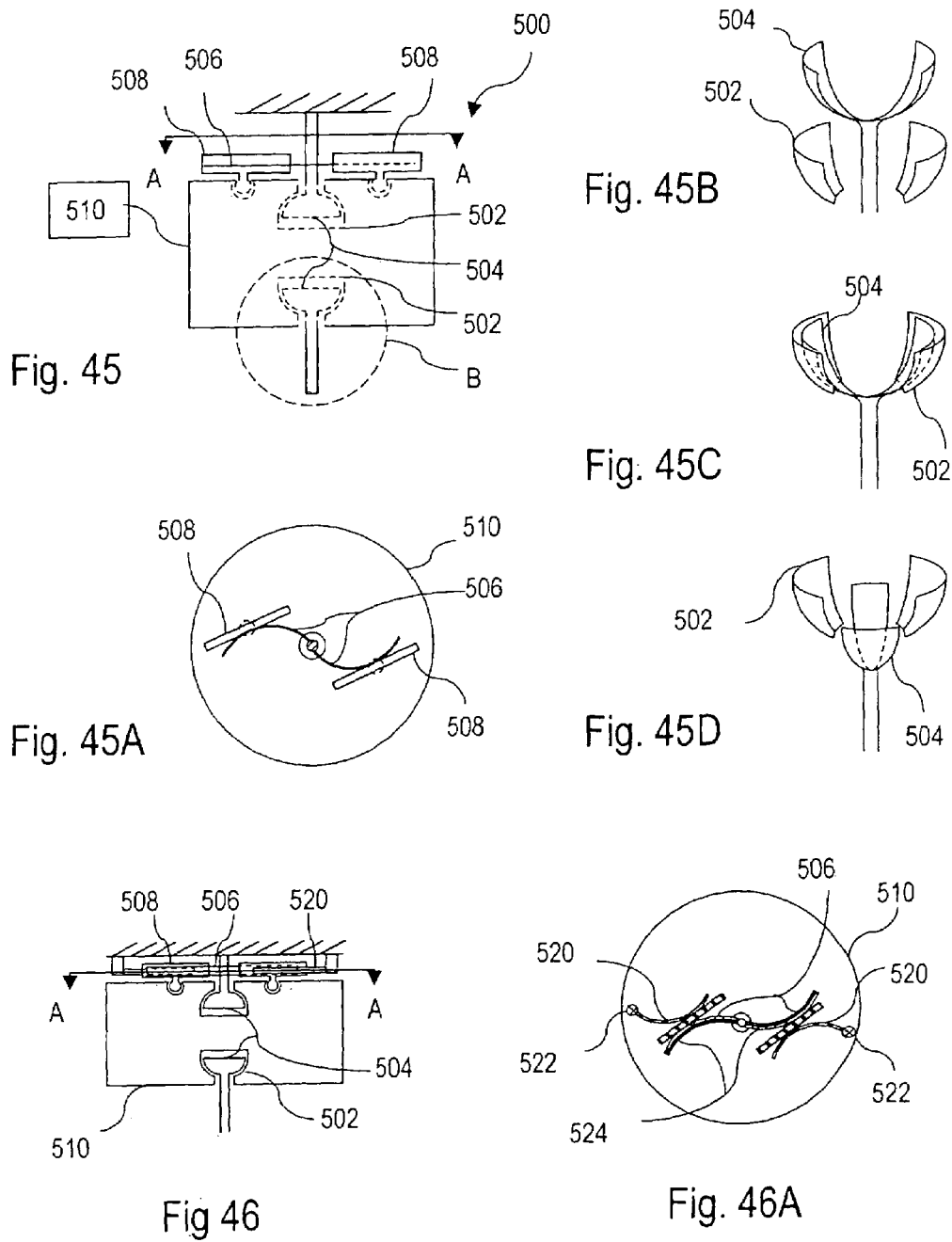

TEMPERATURE ACTIVATED SYSTEMS

CROSS REFERENCE TO RELATED APPLICATIONS

This application is a continuation of application Ser. No. 10/744,768 filed Dec. 22, 2003, now U.S. Pat. No. 7,048,730, which in-turn is a continuation of application Ser. No. 09/815,643, filed Mar. 23, 2001, now U.S. Pat. No. 6,682,521, which claims the benefit of U.S. Provisional Patent Application No. 60/191,703, filed Mar. 23, 2000, entitled Temperature Activated Systems.

FIELD OF THE INVENTION

The invention relates to shape memory material activated devices, and more particularly, the invention relates to shape memory material activated systems, such as, temperature sensors, drug delivery systems, and the like, which employ a shape memory material activator to create a path through a shell.

BRIEF DESCRIPTION OF THE RELATED ART

Temperature warning devices are used as safety devices for products such as pharmaceuticals, foods, and beverages that are subject to loss of potency or strength, chemical alteration or degradation, spoilage, poisoning, and taste or flavor alteration if they are exposed to high temperature or thawed from a frozen condition. Typically, all products have a restricted temperature range outside of which the product begins to change. Many different types of warning devices exist which warn the consumer if the product has reached or exceed its safe temperature limits. Examples of temperature warning devices are described in U.S. Pat. Nos. 5,735,607; 5,531,180; 5,460,117; 5,335,994; and 4,664,056.

Drug delivery devices, such as transdermal patches or implantable drug delivery systems, are available for delivery of drugs to a patient. These drug delivery devices may be manually activated prior to use, such as by the removal of a peelable liner on a transdermal patch. However, it would be desirable to provide on demand activation of a drug delivery device by use of a shape memory material activator.

It would also be desirable to provide a simple and reliable shape memory activated device for use in a variety of applications.

SUMMARY OF THE INVENTION

The present invention relates to the creation of a path through a shell wall with the aid of a shape memory material. The path through the shell wall may release a substance contained in the shell or allow a substance to enter the shell. The devices according to the present invention may be used as temperature sensors or warning devices, drug delivery devices, and the like.

One aspect of the present invention relates to a temperature warning device, drug delivery device, or other device having a shell containing a first substance and an enclosure containing a second substance. Mixing of the substances is achieved by activation of a shape memory material activator. The shape memory material has been deformed in the martensitic state and its $A_s$ to $A_f$ temperature range includes the predetermined temperature which is considered to be the maximum safe temperature of the product. For the temperature warning device, the enclosure is made of either a transparent or opaque material with a transparent window. Once the predetermined temperature has been reached, the shape memory material recovers its shape and in the process applies a stress (tensile, compressive, shear, torsion, or a combination) that results in the creation of a path for the two substances to come in contact. The color of the enclosure fluid changes to indicate this effect and to provide the temperature warning through the transparent window. The path creation is accomplished by the shape memory material by several means such as fracturing, exploding, imploding, puncturing, peeling, tearing, shearing, rupturing, splitting, separating, debonding etc. the shell. The method depends on the type of shell and on how the shape memory material is utilized.

In accordance with one aspect of the present invention, a temperature sensor includes a shell containing a substance capable of providing a visible indication upon release from the shell, and a shape memory material activator for creating a path through the shell to release the substance from the shell in response to exposure to a temperature which is above a maximum safe temperature.

In accordance with an additional aspect of the present invention, a shape memory material activated device for opening a shell containing a substance, the device includes a shell containing a substance, and a shape memory material activator configured to create a path through the shell in response to exposure of the shape memory material to a temperature above a predetermined temperature.

In accordance with a further aspect of the invention, a drug delivery system includes a shell containing a drug, and a shape memory material activator for creating a path to deliver the drug from the shell to a patient when a predetermined temperature of the shape memory material activator is achieved.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 45 is a schematic side view of a release mechanism;

FIG. 45A is a cross sectional view taken along line A-A of FIG. 45;

FIGS. 45B, 45C, and 45D are schematic perspective views of the cup assembly in exploded, assembled, and released configurations, respectively;

FIG. 46 is a schematic side view of another release mechanism;

FIG. 46A is a cross sectional view taken along line A-A of FIG. 46;

DETAILED DESCRIPTION OF THE PREFERRED EMBODIMENTS

Figure 1:
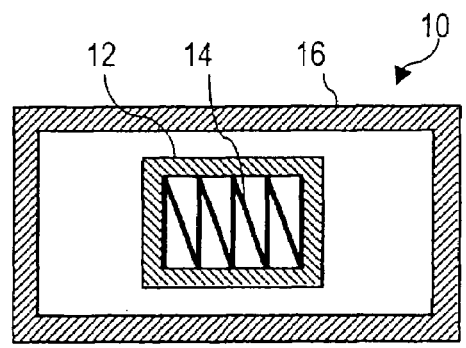
FIG. 1 is a schematic side view of a shape memory material activated device with an internal shape memory material spring.

This document describes a series of inventions for devices whose principal operation is to create a path through a shell in order to release a substance. The path is created with the direct or indirect aid of a shape memory material. The shape memory material acts as a sensor to detect release temperature and activate, or actuate the device to release the substance. The released substance can be utilized alone or it can be mixed with a second substance to produce a new substance with different properties for further utilization. The release rate can be instantaneous at a predetermined temperature or controlled and integrated over time and/or temperature. These systems are mechanical in nature. However, they are capable of becoming electro mechanical as will be shown later. Conversion to electro mechanical operation enhances the performance of the systems and adds further capabilities to them.

The ability to release and/or mix substances at a predetermined temperature or temperature range impart unique capabilities to these devices. Some of these capabilities are: (1) production a new color upon mixing of two substances; (2) direct or indirect absorption of a substance, externally or internally, by a mammalian body; (3) automatic initiation of a chemical reactions; (4) remote controlled mixing rate or concentration adjustment of a chemical solution. Utilization of these capabilities can result in a multitude of new or enhanced applications such as: (1) temperature warning devices and specifically, temperature indicators and time temperature integrator indicators; (2) on demand drug delivery systems; (3) color changing toys; (4) control of chemical reactions. Two of the applications, temperature indicators and on demand drug delivery systems will be used as examples during the description of the invention. However, the embodiments illustrated for one type of system are capable of use for any of the other types of systems described herein.

All inventions described herein utilize a shape memory material to act as temperature sensors and to either activate or actuate the device when the predetermined temperature has been exceeded. Alternatively, the shape memory material may also activate or actuate the device when cooled below a predetermined temperature. Most materials with reasonable shape recoveries and development of adequate stresses during the shape recovery process can be utilized for these devices. Presently Ni—Ti type and Cu based alloys adequately meet these criteria and therefore are considered good candidates for these designs. Throughout the description reference is made to a typical shape memory material Displacement vs Temperature graph shown in FIG. 50.

Temperature warning devices are generally used as safety devices for products such as pharmaceuticals, foods, and beverages that are subject to loss of potency or strength, chemical alteration or degradation, spoilage, poisoning, and taste or flavor alteration if they are exposed to high temperature. Typically, all products have a restricted temperature range outside of which the product begins to change. The temperature warning devices described below warn the consumer if the product has reached or exceed its safe temperature limits. Although most of the description is concentrated on the high end of the temperature range, as it will be seen later, these devices can be used to provide low temperature protection or warnings. The warning provided may be by optical means, such as a color change. Besides the devices that indicate exposure to a temperature, this invention includes designs, utilizing the same principle of operation, for time and temperature integrator indicators. Temperature warning in all cases is provided by creation of a path through a shell containing a dye or other substance. The dye gets mixed with a surrounding fluid to produce a color change. The path opening is permanent for the temperature indicators while it is opened and closed, as temperature fluctuates, in a controlled manner for the time and temperature integrator indicators.

To standardize the nomenclature and avoid confusion due to multiple applications of these devices, at times the shell contents, whether they are dye, drug, solute, solvent, or anything else, will be referred to as the "source". Also, the same contents will be referred to as the substance within the shell to distinguish them from the substance which will be the contents of the enclosure surrounding the shell.

Figure 2A:
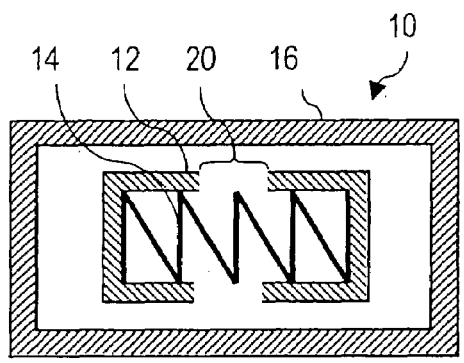
FIG. 2A is a schematic side view of the shape memory material activated device of FIG. 1 after activation.

FIGS. 1 and 2A illustrate a shape memory material activated device 10 including an inner shell 12, a shape memory material spring 14 within the inner shell, and an outer shell or reservoir 16 surrounding the inner shell. According to one embodiment, a first substance is contained within the inner shell 12 and a second substance is contained within the reservoir 16. Initially, the shape memory material is in its martensitic state and has been deformed from its original memory shape to assume the form of a compressed spring, as shown in FIG. 1. Surrounding the shape memory material spring 14 is a first substance in either a solid or a liquid state. Both the shape memory material and the first substance are encapsulated in a moisture impervious material shell 12. During the shape recovery process the shape memory material spring 14 develops sufficiently large stresses to overcome the resistance offered by the shell 12 or encapsulant and to create a path 20 through the shell wall, as shown in FIG. 2A.

For this to take place, a material of the shell 12 must be brittle enough not to allow itself to deform plastically without fracturing. Fracturing allows the first substance from the interior of the shell 12 to be released and, optionally, be mixed/dissolved or otherwise combined with the second substance within the reservoir 16. The color change (if there is one) is preferably visible through a window of the reservoir and becomes a warning indication that the predetermined temperature has been exceeded. Alternatively, the visible indication may indicate another event such as the release of a drug. FIG. 2A shows the inner shell 12 as a capsule that separates or fractures into two pieces upon shape recovery. In this type of design allowances must be made for any volume increase during the recovery process. This can be accomplished by techniques such as entrapment of gas in the enclosure or by making the enclosure of expandable material.

Figure 2B:
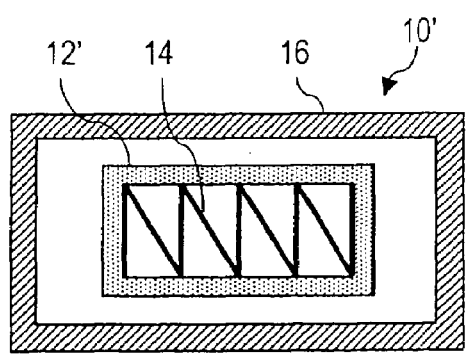
FIG. 2B is a schematic side view of the shape memory activated device of FIG. 1 after activation by stretching.

FIG. 2B illustrates an alternative embodiment of a shell 12' which has been stretched by the shape memory material spring 14 to create multiple small openings or paths through the shell. The paths may be in the form of pores, tears, fissures, or the like that make the shell permeable or semi-permeable to allow a substance to exit or enter the shell. If the openings in the shell are microscopic in size, mixing takes place by diffusion through the shell wall.

The term shell as used herein is intended to mean any container or enclosure which is capable of being fractured, opened, severed, stretched, or otherwise modified to allow a substance to enter or exit the shell.

Figure 50:
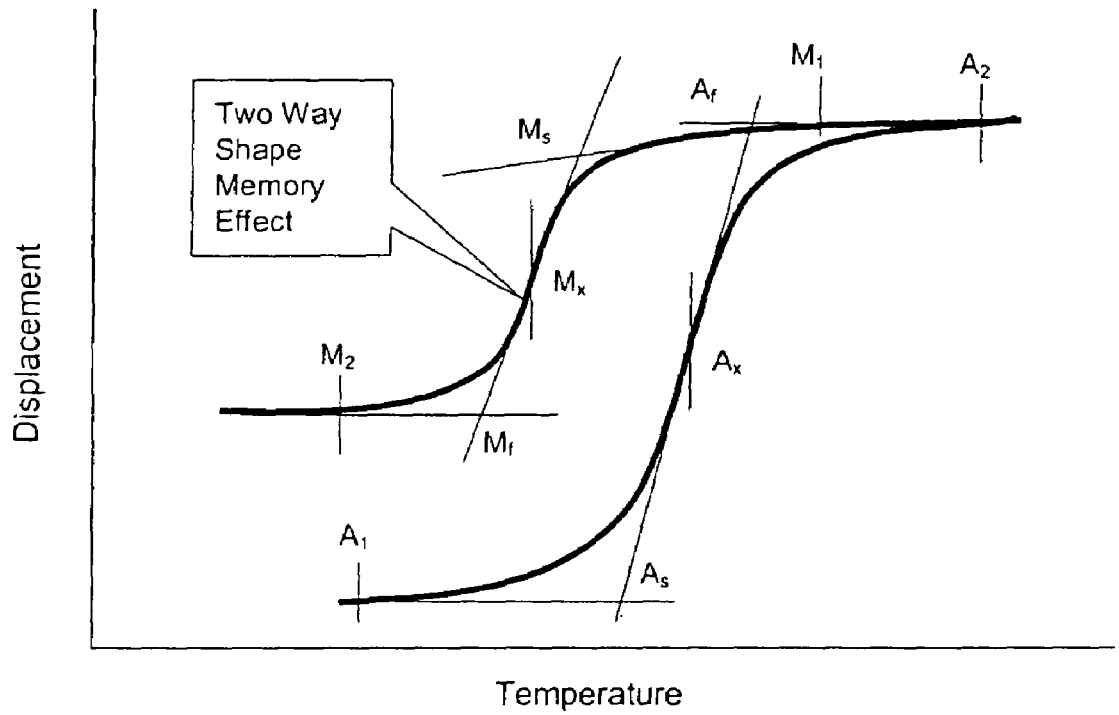
FIG. 50 is a typical shape memory material displacement vs temperature graph.

A temperature at which the device 10 is activated and the mixing of the two substances begins lies between the "Austenitic start" ($A_s$) and the "Austenitic finish" ($A_f$) temperatures of the shape memory material, FIG. 50. By the time the $A_f$ temperature is reached a path has been created through the shell 12 indicating that the shape memory material has recovered its shape either partially or fully. The $A_s$ and $A_f$ temperatures are determined primarily by the chemical composition of the material, its thermo-mechanical processing and the amount of deformation from its shape memory state. The temperature range of operation of the device is equal to the difference between $A_f$ and $A_s$. However, in reality, movement does take place between the temperatures $A_1$ to $A_s$ and $A_f$ to $A_2$. To narrow the $A_1$ to $A_2$ range, sufficient tolerances are allowed between the shape memory material and the inside surface of the shell for partial recovery to take place until temperature $A_x$ is reached. At this temperature the shape memory material spring 14 is in full contact with the inside surface of the shell 12 and the shape recovery stresses begin to be applied to its inside surface. Conversely, by minimizing the tolerances, recovery begins at $A_s$ and the path is created by the time temperature $A_x$ is reached.

The shell in all the embodiments described herein contains the substance or drug to be released. Once the predetermined temperature is reached a path is created through the shell that allows the two substances to come into contact. The two substances can be at any state; solid, liquid, or gas. However, in this application the enclosure substance is preferably in the liquid state and the shell substance is in either the solid or liquid state. Typically, the shell substance is a dye capable of changing the enclosure's color once the two come in contact.

The path creation through the shell is achieved by activation of the shape memory material activator which creates a path by fracturing, exploding, imploding, puncturing, peeling, tearing, rupturing, splitting, or otherwise opening the shell. The shape memory material has been deformed in the martensitic state and its $A_s$ to $A_f$ temperature range includes the predetermined temperature which is considered to be the maximum safe temperature of the product. The enclosure is made of either a transparent or opaque material with a transparent window. Once the predetermined temperature has been reached, the shape memory material recovers its shape and in the process applies a stress (tensile, compressive, shear, torsion, or a combination) that results in the creation of a path for the two substances to come in contact. The color of the enclosure fluid changes to indicate this effect and to provide the temperature warning through the transparent window. The path creation is accomplished by the shape memory material by several means such as fracturing, exploding, imploding, puncturing, peeling, tearing, shearing, rupturing, splitting, separating, debonding etc. the shell. The method depends on the type of shell and on how the shape memory material is utilized.

For the temperature warning device of FIGS. 1, 2A and 2B and those described below, the reservoir 16 can be of any shape as long as it does not interfere with the shape recovery of the shape memory material spring 12 and the path creation process. The reservoir 16 can be made of either rigid or flexible materials. Construction of flexible materials will allow the enclosure to conform to different surfaces for bonding. In the case of the flexible enclosure 16 consideration must be given to the fact that the ambient pressure is transferred to the shell 12 though the second substance or fluid in the enclosure. The shell 12 must be able to withstand this pressure and the shape memory material must be able to overcome it. Although the embodiment of FIGS. 1, 2A and 2B has been described as a temperature warning device, it may also be used as a drug delivery device or in other applications. For use of the device 10 as a drug delivery system, the reservoir 16 has to conform to pharmaceutical requirements.

The actual shape of the deformed shape memory material in the martensitic state does not have to necessarily be in the form of a spring 14, as shown in FIGS. 1, 2A and 2B. Important factors to be considered are; the displacement produced and the actual stress generated during the shape recovery process. These factors depend on the geometry of the shape memory material, amount of deformation, chemical composition of the material, thermo-mechanical processing and, the forces restricting its recovery process.

The shape memory material can be of any shape as long as during recovery it is able to (a) produce sufficient displacement to come in contact with the inside surface of the shell and, (b) produce sufficient force to create a path through the shell walls. Determining factors for the shape of the shape memory material are: the amount of displacement required, and the properties and sizes of both the shape memory material and the shell material.

Figure 3:
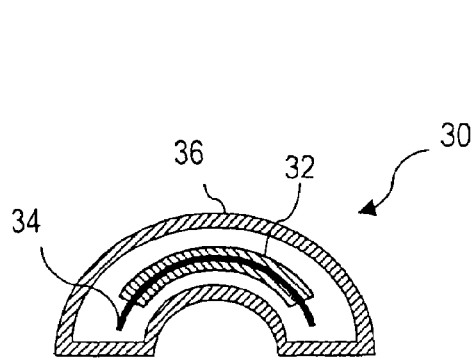
FIG. 3 is a schematic side view of a shape memory material activated device with an internal shape memory leaf spring.

FIG. 3 illustrates an alternative embodiment of a shape memory material activated device 30 having another shape. The device 30 includes an inner shell 32, a shape memory material spring 34, and an outer shell or reservoir 36. The shape memory material spring 34 is in the form of a leaf spring, curved in an initial configuration of FIG. 3 which straightens when exposed to the predetermined temperature. The straightening of the shape memory material spring 34 fractures the shell 32. The device 30 of FIG. 3 illustrates another shape for both the shape memory material spring 34 and the shell 32. The shell 32 is formed of a curved tube shape that can be designed to minimize the volume it occupies.

If the substances contained within the shell 12, 32 and the reservoir 16, 36, prior to mixing or after mixing, react with the shape memory material to the point that either the function of the device or its effectiveness are affected, the shape memory material must be insulated from the substances. This is achieved by containing the shape memory material in a non-reactant material. Alternatively, this may be achieved by placing the shape memory material outside of the shell and/or reservoir as in the embodiments of FIGS. 5, 6, 11, and 19 discussed below.

The shape of the shell 12, 32 depends primarily on the amount of substance it has to contain and, the shape and size of the shape memory material. The shell can consist of one or multiple parts. Also, the fabrication and assembly methods influence the shape and size of the shell. Material selection for the shell depends on both intrinsic and extrinsic factors. Intrinsic factors are material properties that must be such as to allow the shape memory material to create a path through the shell walls. Extrinsic factors are; the type of heating to be used to activate the device i.e. ambient, resistive etc. and, the time required for the device to be activated, once the surroundings have reached the predetermined temperature. Again, the material (or materials if more than one is used) must not react with the substances contained in the shell and the enclosure, prior to mixing or after mixing to the degree that the effectiveness of the device is compromised.

Figure 4:
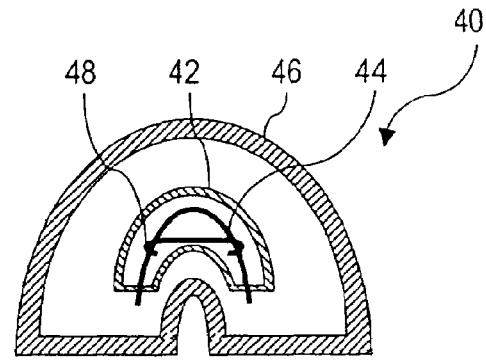
FIG. 4 is a schematic side view of a shape memory material activated device with an internal non-shape material memory leaf spring and a shape memory material release member.

Instead of using a shape memory material to both activate the device and create a path through the shell walls, the shape memory material can be used for the activation process and a regular spring of non-shape memory material or a superelastic material may be used to create the path while the shape memory material is used as a release mechanism. FIG. 4 illustrates an alternative embodiment of a shape memory material activated device 40 having a shell 42, a non-shape memory material spring element 44, an enclosure 46, and a shape memory material release mechanism 48.

Materials considered useful for the non-shape memory spring element 44 include those having spring properties, such as, steel, stainless steels, Beryllium-Copper alloys, and others. The spring element 44 is restrained in a position containing stored mechanical energy by the release mechanism 48. Examples of restrained positions include compressed coil springs or bent wires (as shown in FIG. 4).

The spring element 44 of FIG. 4 is held in the restrained position by the shape memory material release mechanism 48 that has been deformed in the martensitic state to form of a hook or loop. As the temperature rises above $A_s$ the shape memory material release mechanism 48 recovers its original straight shape. At one point, the spring element 44 is able to overcome the restraining force applied by the shape memory material release mechanism 48 and releases itself, goes to its free state and in doing so it creates a path by fracturing, cracking, puncturing, peeling, tearing, shearing, or otherwise forming a path through shell 42. Depending on the shape memory material configuration, different restraining methods can be used. FIG. 4 shows a hook type release shape memory material release mechanism provided on a leaf spring. The hook type release mechanism may also be used in a device with a coil type spring, such as the device illustrated in FIGS. 1, 2A and 2B. A number of different release devices, based on the same principle, are discussed later with respect to FIGS. 45-49.

As illustrated in the embodiments of FIGS. 5, 6, 11, and 19, the same effect achieved by placing the shape memory material activator inside the shell can also be achieved by placing it on the outside.

Figure 5:
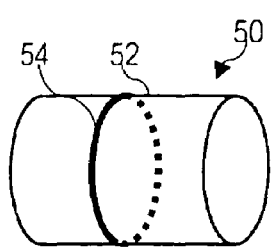
FIG. 5 is a perspective view of a shape memory material activated device with an exterior shape memory ring activator.

FIG. 5 illustrates a device 50 having a substantially cylindrical shell 52 and a ring-shaped, shape memory material activator 54 surrounding the shell. During shape recovery, the ring shaped activator 54 compresses and crushes the shell 52. Also, other shell/shape memory material configurations can be used for this embodiment and the cylindrical shell and ring shaped activator are merely one example.

Figure 6:
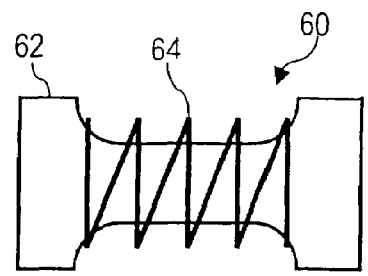
FIG. 6 is a schematic side view of a shape memory material activated device with an exterior shape memory spring activator.

FIG. 6 illustrates a device 60 having an hour glass shaped shell 62 and a spring shaped shape memory material activator 64. According to this embodiment, during shape recovery, the activator 64 expands axially and fractures or otherwise creates a path through the shell 62 by stretching.

Figure 7:
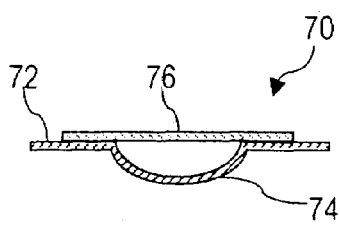
FIG. 7 is a schematic side view of a shape memory material activated device in the form of a popping shell.

FIG. 7 illustrates a popping shell type shape memory material activated device 70. In this concept, the popping shell consists of a shape memory material sheet 72 having a flat austenitic shape and a deformed dimple like martensitic shape, as shown in FIG. 7. The substance to be released is placed in the dimple 74 of the sheet sealed by a seal 76. During shape recovery the material of the popping shell 72 tries to become flat and in the process a path is created releasing the substance. The path is created either through the seal 76 or between shape memory material sheet 72 and the seal at the interface.

Figure 8:
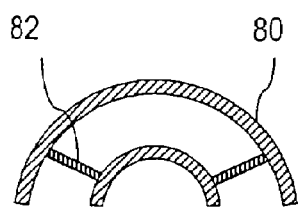
FIG. 8 is a schematic side view of a shape memory material activated device in the form of a shape memory material tube.

FIG. 8 illustrates an example of shape memory material tubular shells. In this concept these shells incorporate shape memory material tubes that have been deformed in the martensitic state, upon transformation to the austenitic state these tubes recover their shapes, and create a path by fracturing the end seals when returning to their memory shape. This concept relies on both volume and shape changes to break the end seals and minimizes the part count required to construct the shell.

Figure 9:
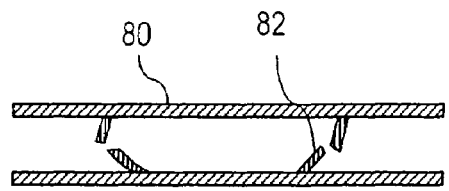
FIG. 9 is a schematic side view of the shape memory material activated device of FIG. 8 after activation.

FIG. 8 shows a bent shape memory material tube 80 which becomes straight upon shape recovery and in the process breaks the end seals 82 and releases its contents. FIG. 9 shows the shape memory material tube 80 after the seals 82 have been broken causing the substance contained in the tube 80 to be released.

In an alternative embodiment, a shape memory material tube may be flattened in the martensitic state to have an oval or other non-circular cross section. The shape memory material tube, upon transformation to the austenitic state recovers a round cross section and breaks the end seals.

Figure 10:
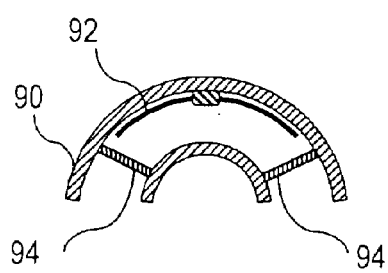
FIG. 10 is a schematic side view of a shape memory material activated device with an interior shape memory material leaf spring.
Figure 11:
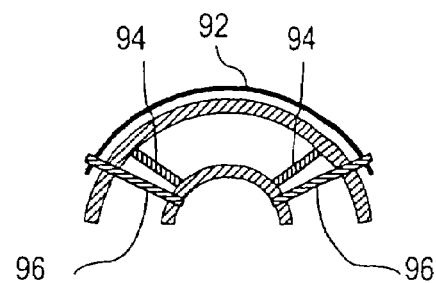
FIG. 11 is a schematic side view of a shape memory material activated device with an exterior shape memory material leaf spring.

FIG. 10 illustrates an embodiment of a non-shape memory material tubular shell 90 with a shape memory material activator 92. This concept utilizes the flexible non-shape memory material tube 90 forming a shell for containing a substance. The shape memory material activator element 92 located either inside (FIG. 10) or outside (FIG. 11) and attached to the tube 90 such that during shape recovery the tube assumes a different shape i.e. bent to straight and in the process breaks the end seals 94. In the case of FIG. 11, where the shape memory material activator element 92 is placed on the outside of the tube 90, the shape memory material activator element 92 is attached to the tube by bands 96 or other means.

Figure 12:
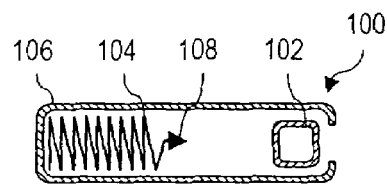
FIG. 12 is a schematic side view of a shape memory material activated device with an impact element.
Figure 13:
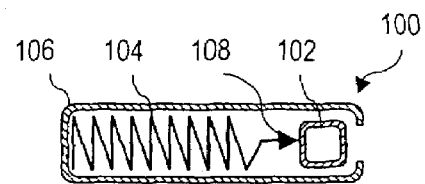
FIG. 13 is a schematic side view of the shape memory material activated device of FIG. 12 after activation.

FIGS. 12 and 13 illustrate an example of the use of shape memory material activators for puncturing or crushing a shell. FIG. 12 shows shape memory activated device 100 including a shell 102 arranged to be punctured by a shape memory material activator 104 in the form of a coil spring. A cylinder 106 is used as a guide for the spring 104. The shape memory material activator 104 may be provided with a puncturing element 108 if necessary depending on the force provided by the shape memory material activator and the strength of the shell 102.

Figure 14:
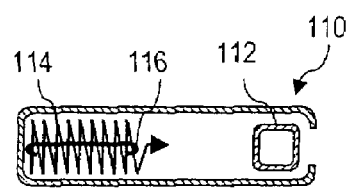
FIG. 14 is a schematic side view of a shape memory material activated device with an impact element and a shape memory material release mechanism.
Figure 15:
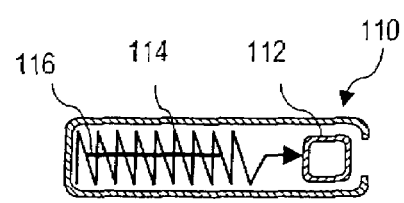
FIG. 15 is a schematic side view of the shape memory material activated device of FIG. 14 after activation.

FIGS. 14 and 15 illustrate the same concept of a shape memory material actuated device 110 in which a shell 112 is punctured or crushed, except that in the device 110, a regular (non-shape memory material) spring 114 is held in compression with a shape memory material release element 116. In both cases the coil spring can be designed to either puncture the shell with a sharp pointed end or to crush it with a blunt end.

Figure 16:
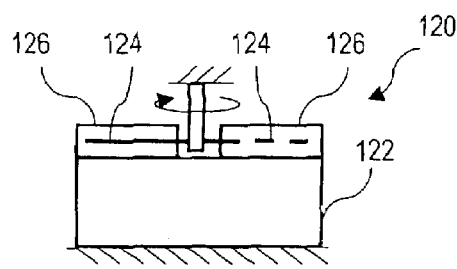
FIG. 16 is a schematic side view of a shape memory material activated device with an external shape memory material activator.

FIG. 16 illustrates a shape memory material activated device 120 which creates a path by twisting the shell. The device 120 includes a shell 122 and two shape memory material elements 124 arranged on paddles 126 attached to the shell. The shear stress generated by the two shape memory material elements 124 become sufficiently large during the shape recovery process to create a path through the shell wall. The paddles 126 can be either rigidly attached to the shell 122 or they can be pivoted and allowed to rotate in order to more efficiently transfer the force generated by the shape memory material elements 124 to the shell. A top view of the device 120 is similar to the release mechanism shown in FIG. 45A.

Figures 17, 18:
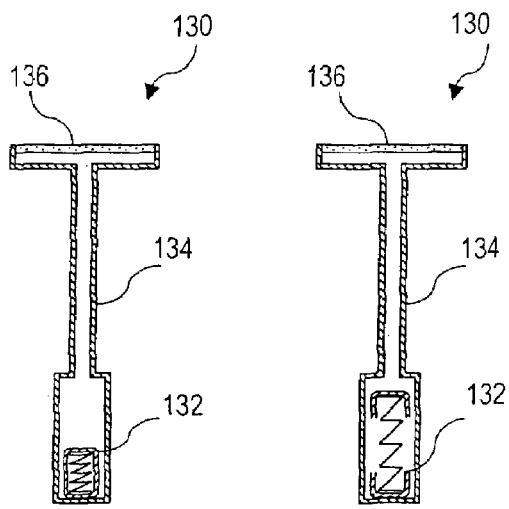
FIG. 17 is a schematic side view of a three dimensional shape memory material activated device.
FIG. 18 is a schematic side view of the three dimensional shape memory material activated device of FIG. 17 after activation.

FIGS. 17 and 18 illustrate a three dimensional shape memory material activated device 130. This concept is utilized to detect bulk temperatures i.e. other than surface temperatures and it is primarily applicable to temperature warning devices. The detection mechanism 132, which can be any of the mechanisms described herein, is placed at the bottom of a tube 134 and a transparent window 136 is attached to the top end of the tube. In this case, the detection mechanism illustrated is similar to the device illustrated in FIGS. 1, 2A and 2B. The tube 134 constitutes a part of the enclosure. The tube 134 can be made of flexible material to accommodate areas inaccessible via line of sight. Once the warning temperature is reached the shell fractures and a color change is produced which is visible through the clear window 136. Typically, the agitation generated by the fracture of the shell will be sufficient to aid the mixing process. However, in the case of long and narrow tubes 134 this may not be sufficient. In these cases, any gas contained in the shell will form one or more bubbles that will rise to the window 136 and in the process produce further agitation thereby enhancing the mixing process. In the cases where no gas is contained in the shell, gas can be incorporated in the dye if made of lightly compacted powder. The gas agitation method will work best if the device is vertically oriented.

Figure 19:
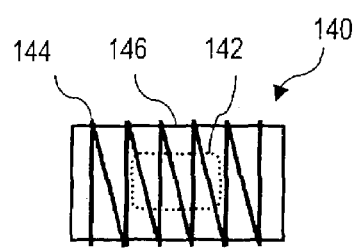
FIG. 19 is a schematic side view of a shape memory material activated device with an indirectly crushed shell.

FIG. 19 illustrates a shape memory material activated device 140 with an indirectly crushed shell 142. The device 140 includes the shell 142, a shape memory material activator 144 in the shape of and external spring, and an enclosure 146. The methods presented so far for creating a path through the shell walls are based on direct application of force on the shell either from the inside or the outside of the shell. Most of these methods can also be used to apply the force to enclosure 146 and have it transmitted to the shell 142 via the fluid of the enclosure 146 (provided that the enclosure contains a fluid), as shown in FIG. 19. This concept is viable when the following two basic conditions are applied: the enclosure does not fracture prior to the shell and, the shell and its contents are not either incompressible or insufficiently compressible to fracture.

A good example of this concept is the case where the contents of the shell 142 are in solid loosely packed powder form. This system offers the advantage of reduced cost by having one common enclosure 146 and shell 142 for use at all temperatures and having the shape memory material activator 144, with different $A_s$ temperatures, installed at the end of the assembly process or prior to the application. Also, it avoids the storage and transportation costs associated with maintaining the devices at a temperature lower that the activation temperature prior to application.

According to one alternative embodiment of the inventions described herein, the invention may employ devices similar to the devices described herein except that the shape memory material activator activates at a minimum temperature. In this embodiment, the shape memory material activator has been trained to achieve a two way shape memory effect. The purpose of this reverse system is to detect minimum temperatures and release a substance from a shell when such a minimum temperature has been exceeded. To do so, a shape memory material is selected whose martensitic transformation range $M_s$ to $M_f$ includes the minimum release temperature. Initially, the shape memory material is trained to achieve a two way shape memory effect with the austenitic (recovered) shape being the installation shape and the martensitic (original) shape being the one undertaken once the material is exposed to the predetermined temperature. At this temperature the shape memory material creates a path through the shell walls and releases the substance from the shell. The shape memory material is required to exhibit the two way shape memory effect only once, when the service temperature drops below the predetermined temperature. In essence, the shape memory material in the reverse system operates in the reverse temperature cycle. Actuation takes place during cooling from austenite to martensite whereas in high temperature activation case, actuation takes place during heating, from martensite to austenite. The same features used in all of the other designs described herein can also used with the reverse system.

Time Dependent Temperature Activated Systems

FIGS. 20-31 relate to time dependent temperature warning systems as will be described below. The time dependent temperature warning systems can be used as an indicator of the time that the device has been exposed above or below a predetermined temperature. The time dependant systems may also be used as a drug delivery system in which case the system is considered as a time compensating drug delivery system.

FIGS. 20-23 illustrate one embodiment of a time dependant device 200 having a shell 202 that consists of two members capable of creating a path upon separation. The first member is a closing part 206 in the form of a conical plug and is in contact with a second part 205, the sealer. A shape memory material activator 208 applies pressure and keeps the two members 205 and 206 in contact along a surface 204. Contact between the two members is maintained until a predetermined temperature is achieved. The device 200 also preferably includes a seal 210 bonded to the sealer. 205, made of a material such as an elastomer capable of swelling through absorption of liquid. The device 200 utilizes the same concept as the "shell" described above, i.e. release and/or mixing two substances. However, in the present case, a shape memory material spring 208 is used that is trained in two way shape memory effect. The substance to be released from the shell 202 may be provided within the sealer 205 and/or within the closing member 206. However, for purposes of simplicity in the following discussion, the substance to be released, called the source, will be considered to be contained within the closing member 206.

In the embodiment of FIGS. 20-23, the path created through the shell wall, to release the substance contained within the closing member 206 and/or the sealer 205 at the predetermined temperature, is not permanent. The path is created by the controlled separation of the shell into two parts, the sealer 205 and the closing member 206. The shell opens every time the predetermined temperature is reached, remains open as long as the temperature does not drop below this level and, closes once the temperature drops. While the shell 202 remains open, the substance is released continuously but the release stops when the shell closes. With each opening the drug or other substance is released to a surrounding reservoir (not shown) in a continuous manner.

Figure 20:
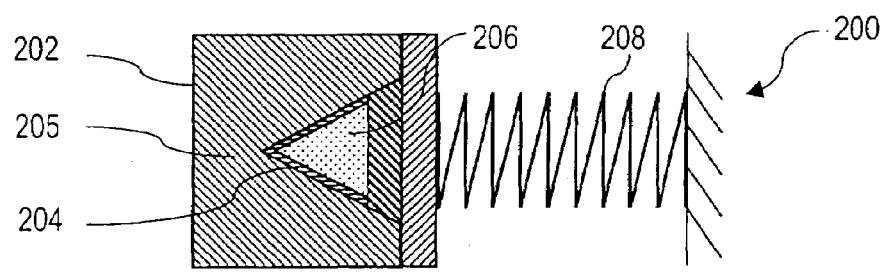
FIG. 20 is a schematic side view of a shape memory material activated time dependent release system in an as installed position.
Figure 21:
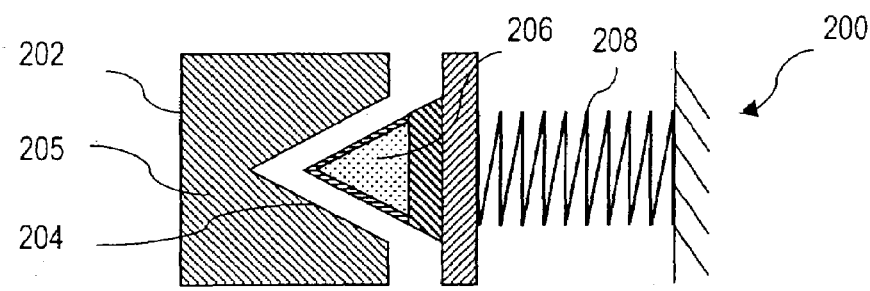
FIG. 21 is a schematic side view of the shape memory material activated time dependent release system of FIG. 20 in an open position.
Figure 22:
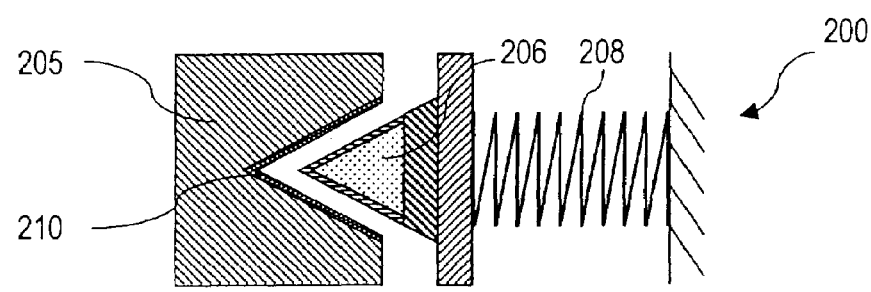
FIG. 22 is a schematic side view of the shape memory material activated time dependent release system of FIG. 20 in an open position with a sealer which has absorbed moisture.

FIG. 20 illustrates the sealer 205, the closing member 206, and the shape memory material activator 208 in a closed position before an initial opening. FIG. 21 illustrates an initial opening of the shell 202 and the creation of a path along the contact surface 204 by the movement of the closing member 206 in response to achieving a predetermined temperature. After opening, the seal 210 provided in the opening 204 comes into contact with the fluid of the enclosure and begins to swell as shown in FIG. 22. When the predetermined temperature for opening is no longer achieved, the closing member 206 moves back and comes into contact with the seal 210 and closes the path thereby preventing passage of fluid through the opening 204.

According to the embodiment of FIGS. 20-23, if the substance contained in the shell 202 is in the solid state the surrounding reservoir (not shown) should contain a fluid to dissolve it. On the other hand, if the substance contained in the shell 202 is in liquid state it can be released to either an empty reservoir to be delivered to the patient without further mixing or to a fluid filled reservoir to be mixed with fluid prior to delivery. Control of the mixing rate in the solid/liquid case is by direct contact whereas in the liquid/liquid case control of the mixing rate is done through a membrane or filter which is part of the sealer's and/or closing member's wall. Because of the continuous release, irrespective of its solid or liquid phase and irrespective of whether it is a dye or a drug, the substance within the shell will be considered as the "source" herein. The shell's liquid source should be under positive pressure relative to its surroundings, with no gas entrapment, to assure wetting of all membrane walls and a constant interface between the two fluids irrespective of orientation. Additionally, pressurization prevents the reverse flow of the substance outside of the shell in the enclosure into the source's housing. Reverse flow can also be prevented with the use of one way membrane. The principle of osmosis can be utilized to transport the source through the membrane wall provided that the membrane material and liquids of both shell and enclosure are selected such as to satisfy the requirements for osmosis to take place. Pressurization can be accomplished by several means such as the use of a spring as a piston, a gas bladder, or a compressed elastomer pressuring the dye enclosure, etc. The shape of the shell's solid state source or its liquid state container can be conical (as shown), spherical, or any shape that can be sealed when pressed against an organic material such as an elastomer having springback properties with minimum compression set or creep. Basically, the source forms the male part and the sealer the female part of the device. When in contact with each other there is no open path and no release of the substance from the shell.

Figure 23:
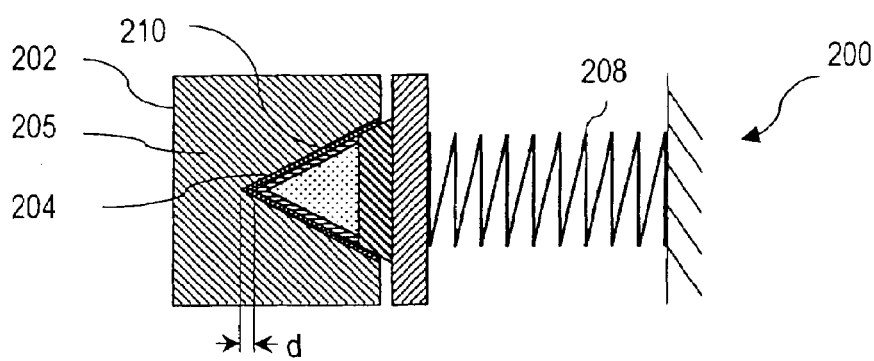
FIG. 23 is a schematic side view of the shape memory material activated time dependent release system of FIG. 20 in a closed position after the sealer has absorbed moisture.

If the seal 210 is made of material that swells with exposure to fluids, the swelling (increase in volume and thereby linear dimensional increase, distance d in FIG. 23) will account for any loss of shape memory with cycling of the shape memory material activator 208.

Figure 26:
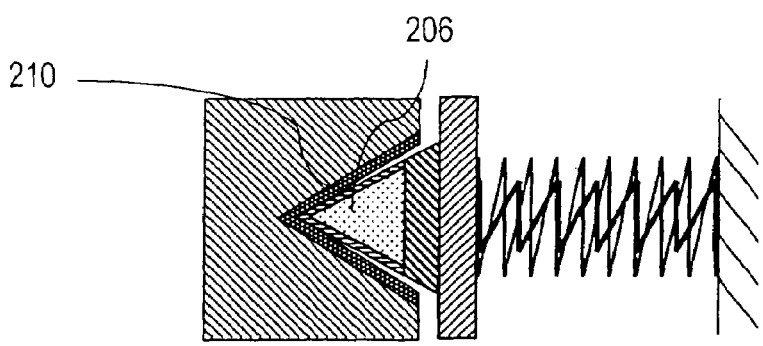
FIG. 26 is a schematic side view of a shape memory material activated time and temperature dependent release system in a partially opened position.
Figure 27:
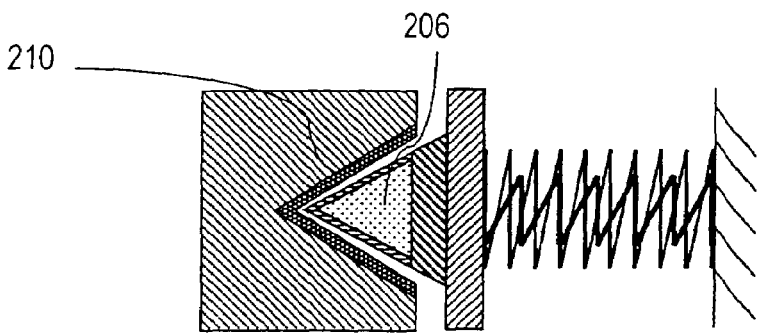
FIG. 27 is a schematic side view of the shape memory material activated time and temperature dependent release system of FIG. 26 in a fully opened position.

If the source is in the solid state and in the form of a cone, sphere, or other shape, it must be dissolved uniformly such that it can be sealed at the end of each cycle. In the case of a time compensating drug delivery system the solid state drug source can contain a gradient of the active ingredient such that the released drug increases in potency with increased exposure time. In the case of a time integrator indicator the dye can consist of several layers of different colors (with one color being exposed at any given time) so that different colors are produced with increased exposure time. Color change will be indicative of the time exposure above or below the predetermined temperature. For better accuracy, the surface of the seal 210 in contact with the source 206 must be sealed so that any absorbed liquid will not continue to dissolve the source. Also, the shape of the drug source must be designed such that the liquid at the interface is displaced during the completion of the cycle, i.e. upon return to the martensitic state. One way this is achieved is to allow for more cushion at the first contact point, i.e. peak of cone or sphere, and decrease the amount of cushioning as the contact continues. An example of this configuration is shown in FIGS. 26 and 27 of which FIG. 26 illustrates a partially recovered position and FIG. 27 illustrates an open position. In other words, it may be preferred to prevent either instantaneous contact or reverse (base to peak) contact.

Figure 24:
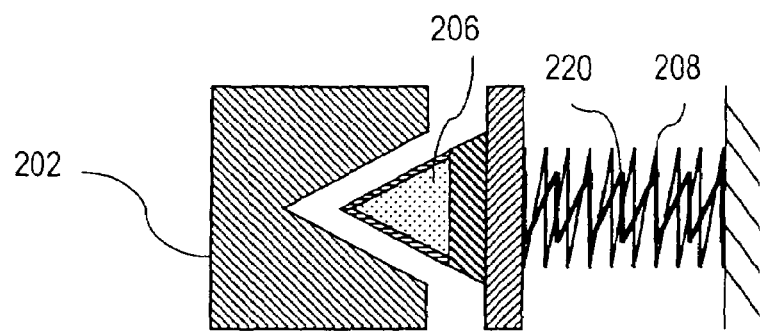
FIG. 24 is a schematic side view of a shape memory material activated time dependent release system with an elastomer bias spring.

Instead of using a shape memory material trained in two way shape memory effect, the cycling can also be accomplished with the incorporation of a bias spring 220 along with the shape memory material spring 208, as shown in the embodiment of FIG. 24. The system of FIG. 24 will assure that there is sufficient pressure to keep the source sealed during the shell's closing period by the use of the bias spring 220.

The time integrator indicator devices of FIGS. 20-31 are capable of integrating exposure to a single temperature or temperature range with respect to time. Additionally, they are capable of giving more weight to higher (or lower) temperatures. In other words they are capable of non-linear integration of temperature with time. The time-temperature history can be presented through a color change of the indicator.

The same concept can be used without the swelling effect. In this case the seal must provide the cushioning and sealing, and must exhibit minimal creep in the expected operational temperature range. Again, a bias spring can be used to minimize the amnesia of the shape memory material activator and assure sufficient contact pressure to displace the fluid from the sealer/drug source interface.

Figure 25:
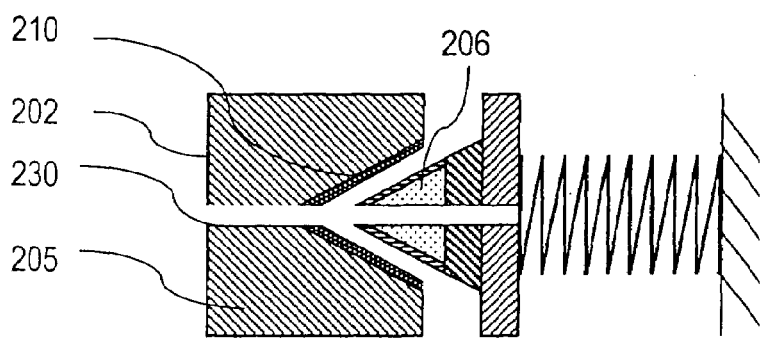
FIG. 25 is a schematic side view of a shape memory material activated time dependent release system with a central hole.

In both cases, swell and no swell of the seal 210, the source 206 can be made the stationary member and the sealer 205 the moving one. In addition, as shown in FIG. 25, one or more holes 230 can be incorporated in both the sealer 205 and the source or closing member 206 to eliminate the possibility of vacuum locking.

The concept used for the time dependent shell described above with respect to FIGS. 20-25 can be extended to become a time and temperature compensating drug delivery system and a time and temperature integrator indicator. This requires one of the two following design changes.

The first change requires selection of the source material, membrane (if one is used) and, enclosure fluid such as to control the release or mixing rates with respect to temperature. In other words, release is both material and temperature dependent. With this system, at a constant temperature above $A_s$ and with increasing time the drug release rate remains constant as time goes by. However, the release rate increases as the temperature increases. If a solid state drug source is used which is built of different strength layers, the release rate will be increasing incrementally, as each layer is dissolved, with either time itself at constant temperature or time and temperature. The strength levels and the rate of change must be calibrated for specific applications, as each application requires different temperatures and times. This concept has only a lower temperature limit. The temperature application range is bounded only at the low end which is the $A_s$ temperature. Above this temperature the path through the shell wall remains open and release or dissolution of the source continuous. Upper bound is only limited by material capabilities.

The second change requires modification of the geometry of the source such that there is a progressively larger gap, tip to base, between the sealer and the source, as shown in FIGS. 26 and 27. As the temperature increases above $A_s$, the shape recovery progresses and the source or closing member 206 is withdrawn away from the seal 210, the interface area between the source and the fluid of the enclosure increases. This increase results in an increased release (or mixing) rate that is proportional to the increase in the interface area. By varying the geometry of the source (conical, spherical, etc.) the rate of the interface area change is controlled with respect to the withdrawing rate of the source. In return, the degree of linearity and the slope of the $A_s$ to $A_f$ and $M_s$ to $M_f$ segments of the hysteresis curve, as influenced by the bias spring, determine the withdrawal rate of the source. With this concept, at constant temperature above $A_s$ the release rate stays constant (assuming linearity with respect to mixing ratio) but it increases with increasing temperature. Applicability of this concept is limited to the temperature range of the hysteresis curve of the shape memory material as there is no further displacement produced by the shape memory material above $A_f$ and therefore no further temperature compensation takes place. During cooling, the process is reversed except that the $M_s$ to $M_f$ temperature segment of the hysteresis curve determine the return rate of the source.

With this design change, the drug release rate of the time and temperature compensating drug delivery system remains constant with time at a constant temperature but it increases as the temperature increases. The increase can be designed to be either linear or non-linear. The increase in release rate translates into an increase in drug strength. In the case of time and temperature integrator indicator, the mixing rate of the dye remains constant with time at constant temperature and increases the color depth of the enclosure's fluid at a constant rate. The mixing rate of the dye increases with temperature, linearly or non-linearly, and in return it accelerates the increase in color depth accordingly. Additionally, the dye source, if used in the solid state, can be made up of several layers of different colors. Each layer as it is mixed with the enclosure's fluid will produce a new color that will reflect, in a more discerning way, the time and temperature history.

As shown in the embodiments of FIGS. 24, 26, and 27, both the shape memory material activator 208 and the bias spring(s) 220 can be placed in parallel with the shell, either outside or inside, respectively.

Figure 28:
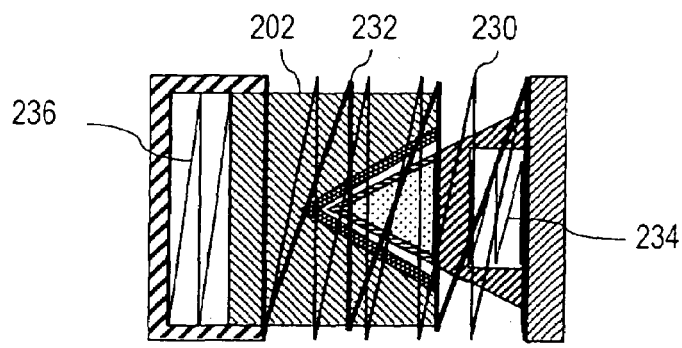
FIG. 28 is a schematic side view of an alternative shape memory material activated time and temperature dependent release system.

As shown in FIG. 28, the shape memory material activator spring 230 is provided outside of the shell 202 and the bias spring 232 is provided outside of the shell. Two additional springs are shown, including a pressurant spring 234 and a compensating spring 236. The pressurant spring 234 is used to keep the liquid source under pressure in order, as mentioned above, to keep the walls of the membrane wet. Alternately, the pressurant spring 234 can be replaced with a pressurized bladder. The compensating spring 236 is used to compensate for any increase in swelling, minimize the effects of any compression set of the sealing means or minimize any minor effects of any non-uniform dissolution of a solid state source.

Figure 29:
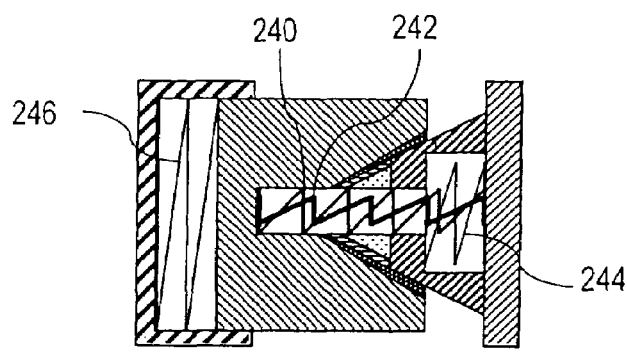
FIG. 29 is a schematic side view of a further alternative shape memory material activated time and temperature dependent release system.

FIG. 29 illustrates an alternative arrangement for the device of FIG. 28 wherein a shape memory material activator spring 240 and a bias spring 242 are provided in a central hole and the pressurant spring 244 and compensating spring 246 are provided as in FIG. 28. Attributes for each concept can be combined to produce a device with more degrees of freedom and more versatility.

Figure 30:
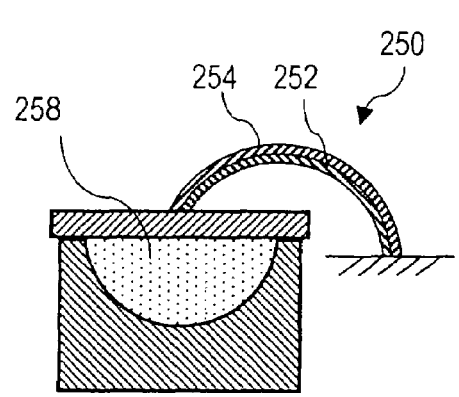
FIGS. 30 and 31 are schematic side views of a dome shaped, shape memory material activated time and temperature dependent release system in a closed and open position.
Figure 31:
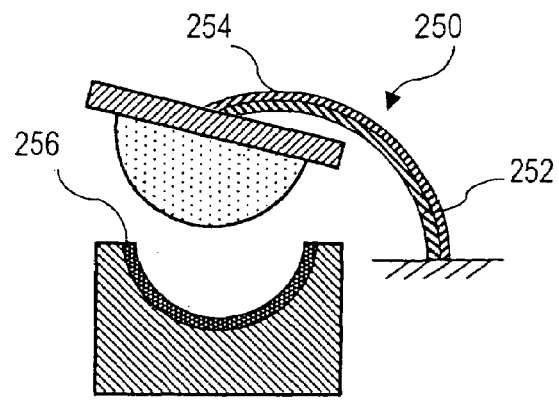

FIGS. 30 and 31 illustrate an alternative embodiment of a shape memory material activated device 250 using leaf springs and a dome shaped closing member. As shown in FIG. 30 a shape memory material leaf spring 252 with an attached or adjacent leaf bias spring 254 can be substituted for the coil springs. Also, in the embodiment of FIGS. 30 and 31, the sealer 256 and the closing member 258 are in the form of dome shaped members.

In all the embodiments discussed herein, the closing member or the shell can be made the moving part and the other part the stationary one simply by exchanging places of the shape memory material and bias springs with the compensating spring.

In all the embodiments described herein, more than one shell, containing the same or different substances, such as drugs of various degrees of potency in the case of a drug delivery system, can be used with a single enclosure. They can all be activated at the same or different temperatures. For shape memory materials to be activated at different temperatures, the chemical composition or the processing of the material must be different. Multiple shells will allow for several reactions/mixings between the two substances to take place. As an example, in a drug delivery system with multiple shells, shell #1 contains a drug that is to be released at a predetermined temperature while shell #2 contains the same drug of higher potency to be released at a higher predetermined temperature. As a second example, if each shell contains a different color dye, the fluid of the enclosure will obtain a different color at each predetermined temperature. Each color will correspond to a different temperature that will be indicative of a different level of warning.

Peelable Shell Systems

The devices illustrated in FIGS. 32-40 relate to the use of a shape memory material activator to peel a barrier layer away from a shell creating a path through the shell. The peelable shell devices may be used to enhance the characteristics of the transdermal (patch) and implant type drug delivery systems by converting them from continuous delivery systems to "on demand" drug delivery systems. The peelable shell devices may also be used for temperature warning devices, however, these devices will be described primarily with respect to the delivery of drugs. The operating principle of the peelable shell systems is the same as for the temperature warning devices, the difference being that the shell contains a drug instead of a dye. The drug is released into a reservoir that is specifically designed to transmit it to the patient. The reservoir may contain another drug, in either the solid or liquid state, that is to be mixed with the one that is released.

For purposes of background, there are two types of transdermal drug delivery systems, also known as patches. One that contains the drug in a reservoir and releases it through a rate controlling membrane, and a second one which contains the drug in a polymeric matrix which is applied directly to the skin. In both cases the skin begins to absorb the drug as soon as the protective liner is removed and the patch is adhered to the skin. The device presented here takes the patch concept one step further and advances it to be qualified as an on demand transdermal drug delivery system. This is accomplished with the addition of a peelable barrier between the drug and an intermediate layer of the transdermal drug delivery system or the drug and the skin. This layer is automatically removed (peeled away) only, after the patch has been applied to the skin and only when and if there is demand for the drug.

Automatic removal of the barrier is achieved with the incorporation of a shape memory material activator in the device. Demand is determined by several ways. In the case of fever, the shape memory material can act either as both a sensor to detect the rise in temperature and as an actuator to remove the barrier layer at a predetermined temperature or simply as an actuator with the sensor being replaced with a separate temperature detection device. In the second case, activation of the shape memory material will require an external energy source to heat it and enable it to undergo the shape recovery process. In other cases such as cardiovascular and hormonal drugs, the shape memory material device is only used as an actuator with the sensing provided by added detectors. When detectors are used, microprocessors can also be incorporated to provide additional features to further enhance the self controlled characteristics of the device.

An added feature of this system is the fact that actuation can also be achieved manually. This is accomplished with the application of heat source such as a hot towel to the device. For this to work, the temperature of the applied heat source must be high enough for the shape memory material activator to undergo shape recovery. On the other hand, this temperature should not be so high as to alter the nature or potency of the drug nor should it change its ability to be absorbed by the skin.

In addition to the peelable layer, in the case of the drug reservoir type transdermal device, the shell can be placed inside the reservoir. Release of the drug into the reservoir takes place at the predetermined temperature. The reservoir may contain another drug or carrier with which it gets mixed prior to the absorption process.

Figure 32:
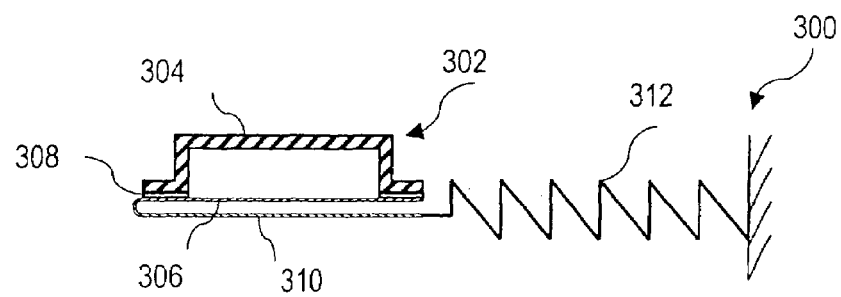
FIG. 32 is a schematic side view of a peelable shape memory material activated time dependent release system.
Figure 33:
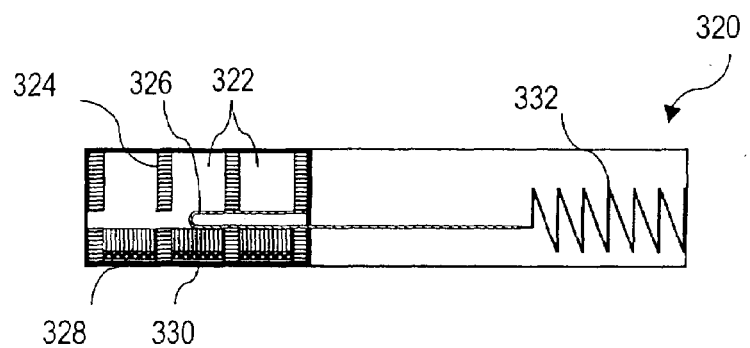
FIG. 33 is a schematic side view of a peelable shape memory material activated time dependent release system in the form of a transdermal patch.

In all cases, multiple shells can be used with each device to enable incremental adjustment of the drug dosage with respect to fever or other parameters. FIGS. 32 and 33 illustrate the basic components and operating principle of the peelable shell device 300. For a temperature warning device, the device 300 utilizes the mixing of two substances to produce a color change once the predetermined temperature of the device is reached. For a drug delivery device, the device 300 releases a drug from the shell. The device 300 consists of a shell 302 formed by a rigid or semi-rigid backing 304 and a protective liner 306. The protective liner 306 is attached to the backing 304 by an adhesive 308. The protective liner 306 is connected by a pull tab 310 to a shape memory material activator 312. The shell 302 for the temperature warning device is positioned within or adjacent an enclosure which may contain a second substance.

The peelable shell drug delivery system consists of substantially the same components as the temperature warning device described above except, the substance delivered from the shell is a drug. The device incorporates a drug containing shell inside a drug reservoir. The shell encapsulates the drug to be released into the reservoir that will deliver it to the patient as a transdermal or implanted system. The reservoir can be either empty to receive the drug contained in the shell or filled with another drug to be mixed with the one released by the shell. The second option provides the advantage of extending a drug's shelf life if mixing is to take place at the time of application instead of the time of manufacturing.

Again, activation of the device 300 takes place when a shape memory material activator 312 peels the protective liner 306 which creates a path through the shell 302 for the drug to be released to the reservoir. The shape memory material can be placed either in the inside or the outside of the shell and must be compatible with the drug or be coated with a coating that is compatible with the drug. For transdermal systems verification of the release can be provided through a transparent window in the reservoir that will exhibit a color change.

As shown in the embodiments of FIGS. 32-40, the path through the shell 302 is created by a peeling process. The shell 302, that may contain a dye or a drug, is formed by two parts; the rigid or semi-rigid backing 306 and the flexible protective liner 306 held together with the adhesive 308. With the incorporation of a shape memory material activator 312 the protective liner 306 is peeled away automatically once a predetermined temperature is exceeded, thereby creating a path for the substance within the shell 302 to be released.

As shown in the embodiments of FIGS. 33-38, the shell can be divided into multiple individual shells with each shell containing the same source such as the same drug of equal or increased strength, or a different drug. As the temperature increases more shells are peeled away. With this incremental process the drug strength or color depth of the enclosure changes with each shell that is peeled away. Each color is indicative of exposure to a specific temperature. In the case of on demand drug delivery systems, the drug can be released for direct absorption by a mammalian body through a rate controlling membrane or it can be mixed with another drug prior to the absorption process.

FIG. 33 illustrates a transdermal drug delivery device 320 having multiple shells 322 separated by barriers 324. A peelable protective liner 326 is provided between the shells 322 and a rate controlling membrane 328 and is activated by a shape memory material activator 332. An adhesive layer 330 may be used to affix the device 320 to a patient.

Figure 34:
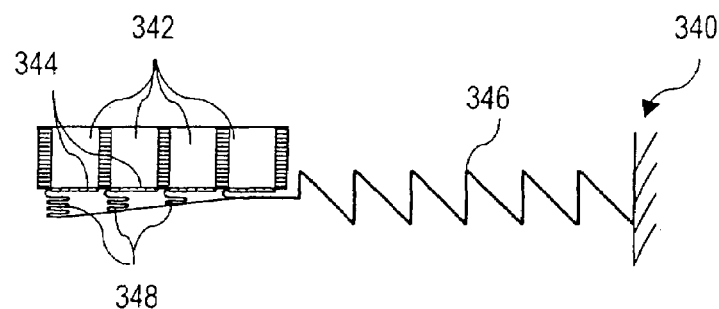
FIG. 34 is a schematic side view of a peelable shape memory material activated time dependent release system with multiple shells.
Figure 35:
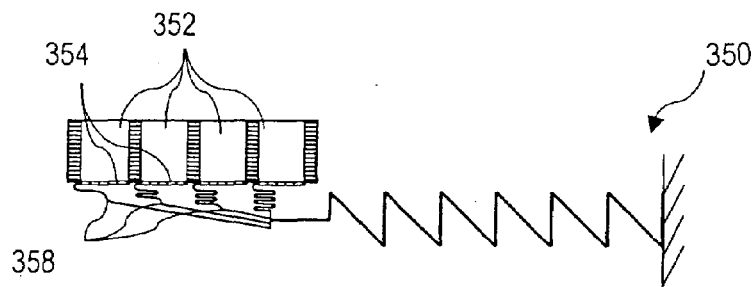
FIG. 35 is a schematic side view of an alternative peelable shape memory material activated time dependent release system with multiple shells.

FIGS. 34 and 35 show a similar concept of multiple shells 342 and a single activator 346 with each shell having its own liner 344. This concept has the advantage of minimizing the overall length of the device and by adjusting the length of the individual tabs the temperature range between peelings can be adjusted accordingly. FIG. 34 shows a device 340 having multiple shells 342 connected in series with individual tabs 348 of varying lengths connected in series such that the shells on a right hand side of the device are peeled first.

FIG. 35 shows a device 350 having multiple shells 352 with individual liners 354 and individual tabs 358 of varying lengths connected in parallel such that the shells on the left hand side of the device are peeled first. With this concept, peeling of each shell is independent of the others in the group.

In the embodiments of FIGS. 34 and 35, the shells are peeled away at equal temperature ranges provided the movement of the shape memory material spring is linear with respect to temperature. The length of the individual tabs may be equal or unequal which results in a peeling sequence of even or uneven temperature ranges. The peeling rate with respect to temperature can also be controlled with the width of the individual shells. In an alternative embodiment, in which tabs are provided of equal length, the shells are peeled simultaneously.

Figure 36:
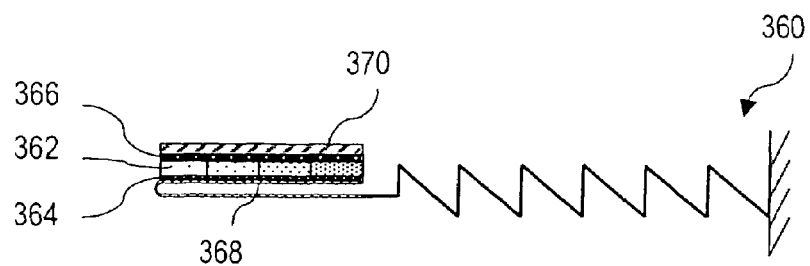
FIG. 36 is a schematic side view of a peelable shape memory material activated time dependent release system for delivery of a powdered substance.

FIG. 36 shows a concept in which the shells are filled with a solid state substance, such as a compacted powder of drug or dye. In a device 360 of FIG. 36, the powder 362 is sandwiched between two adhesive layers 364, 366 and together with the sandwiched source constitutes the shell. The adhesive layer 366 connects the shell to a backing 370. During shape recovery the protective liner 368 on the adhesive layer 364 is peeled away at a rate corresponding to the temperature change exposing the substance 362 to the fluid of the enclosure in continuous fashion. In this case, the substance 362 is a true source. The advantage of this system is the fact that different source strengths or different sources can be used along the length of the strip. This concept is equivalent to time-temperature dependent systems except, it is restricted to a single one half of a temperature cycle, either $A_s$ to $A_f$ or $M_s$ to $M_f$.

The peelable shells can be arranged in different sizes and patterns to accommodate different requirements of temperature spans, types of sources, sequence of releases etc. In addition, the configuration of the peelable protective liners can be varied to accommodate different requirements. Some of the different patterns include shells of different widths, shells arranged in both series and parallel fashion, and shells with circular shaped or blister type drug containing cavities in series and/or parallel.

For transdermal systems the device should be designed such as to prevent any deformation of the shape memory material element during handling and application of the patch in order not to affect its performance. It is recognized that the patch is not applied to rigid flat surfaces and each application is unique in terms of geometry. In order to avoid deformation of the shape memory material during the application process, the shape memory material can be housed separately from the patch in a rigid housing and be connected to the barrier layer with a flexible conduit.

Figure 37:
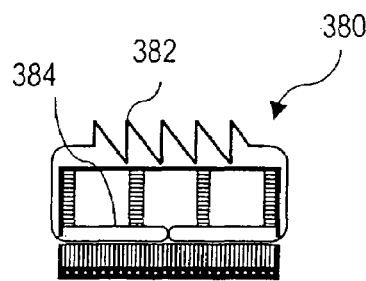
FIGS. 37 and 38 are schematic side views of a peelable shape memory material activated time dependent release system with a peelable liner pulled from two sides.
Figure 38:
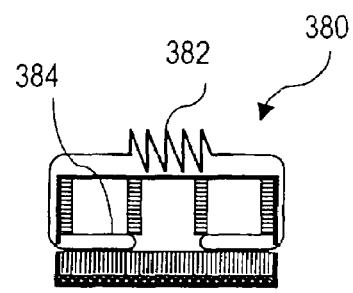

FIGS. 37 and 38 show an alternative embodiment of a transdermal patch device 380 with the shape memory material activator 382 placed on top of the patch. In FIG. 38, the shape memory material activator 382 has pulled the barrier 384 from two sides. However, it should be understood that the barrier may also be pulled from one side of the patch.

Figure 39:
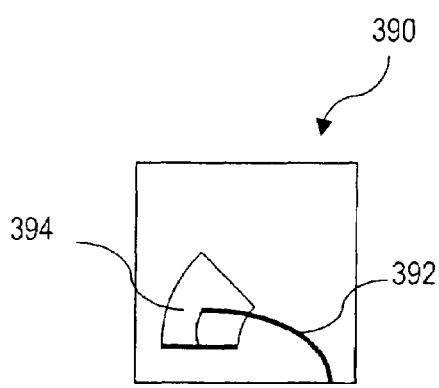
FIGS. 39 and 40 are schematic side views of a peelable shape memory material activated time dependent release system with a rod shaped activator.
Figure 40:
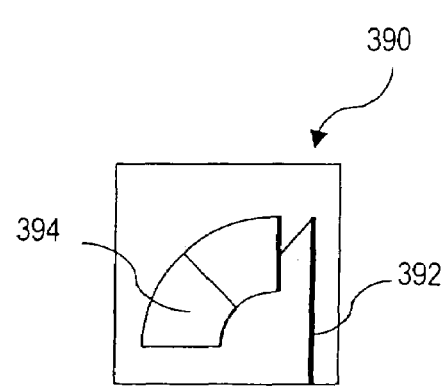

Besides the use of the coiled shape memory material spring as shown in FIGS. 32-38, the peelable shell device may include a leaf spring or other shape memory material activator to peel the liner. FIGS. 39 and 40 show a peelable embodiment of a shape memory material activated device 390 in which the shape memory material activator 392 is in the form of a leaf spring. The shape of the shell 394 and the peelable liner 396 should accommodate the movement of the shape memory material activator 392. As with the shape memory material coil spring, a multi-shell construction can also be used with the leaf spring. In both cases, coil spring or bent wire, shells with different geometry clustered together in different patterns can be used.

When the drug delivery device is a device of the type where the drug is provided in a matrix the auto-peelable barrier is placed at the bottom of the matrix. An extra liner, between the peelable barrier and the matrix would help minimize the startling effects of the sudden barrier movement during shape recovery. This layer should be transparent to the drug or contain large holes such that the most of the matrix is in contact with the skin. The matrix may be segmented and each segment having its own barrier. The barriers are removed in a "curtain" fashion with each curtain attached separately to the shape memory material activator. By varying the curtain length, each cell can be exposed to the skin at different temperature. Curtains close to the fixed end of the spring tend to produce smaller movements which necessitates smaller cells. However, by adjusting the curtain length of the individual cells, all cells can have the same size.

Another concept involves two barriers, one stationary and one mobile. Both barriers have alternating strips with cut outs of the same size. Initially, the two barriers are placed out of phase such that the drug matrix is sealed. Upon shape recovery one of the barriers begins to move exposing small areas of the matrix to the skin. At the end of the shape recovery process the strips and cutouts of the two barriers are in phase and maximum exposure is achieved.

Release Mechanisms

The following description relates to shape memory material activated release mechanisms, such as described above with respect to FIG. 4. It should be understood that the combination of a non-shape memory material mechanical element and a shape memory material release mechanisms may be used in place of a shape memory material spring in any of the embodiments described above.

mechanism can also be used in the impact shell devices shown in FIGS. 41-44. These embodiments allow for the release of stored mechanical energy to create an impact force to create a path through the shell wall in a rapid way to achieve a more precise temperature-release control.

Figure 41:
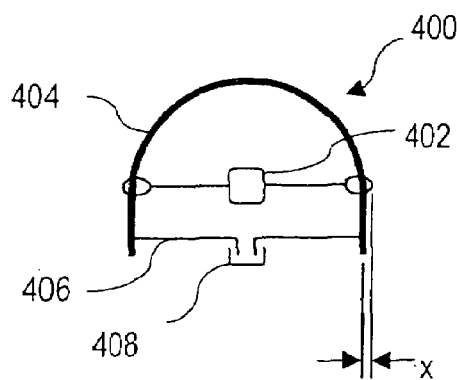
FIG. 41 is a schematic side view of a shape memory material activated release system in the form of an impact shell.

FIG. 41 illustrates a shape memory activated device 400 including a shell 402 and an elastically deformed spring member 404 (such as a wire or strip) to store the energy required to fracture the shell. The spring 404 can be made of either superelastic material or regular spring material. The spring 404 is kept in the bent position with two tension wires 406 (or rods) connected with a release mechanism 408. FIG. 41, shows the shell 402 being loosely suspended between the two ends of the spring 404 with two wires 406 or rods. The loose suspension concept allows the spring to move the distance x and prevents minor forces, generated from $A_1$ to the release temperature, to be transferred to the shell and fracture it prematurely. In addition, it allows the released spring 404 to obtain momentum before it fractures the shell 402.

Figure 42:
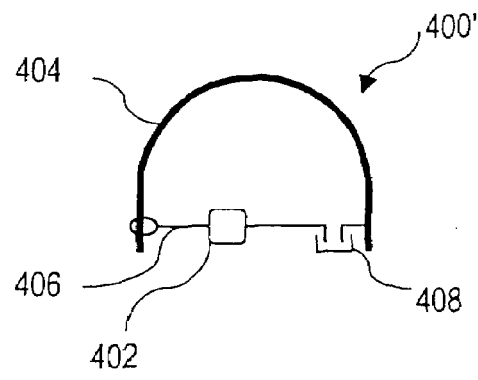
FIG. 42 is a schematic side view of another shape memory material activated release system in the form of an impact shell.

As shown in FIG. 42, the shell 402 may also be positioned in line with the release mechanism 408 along the wires 406 in the device 400'.

Figure 43:
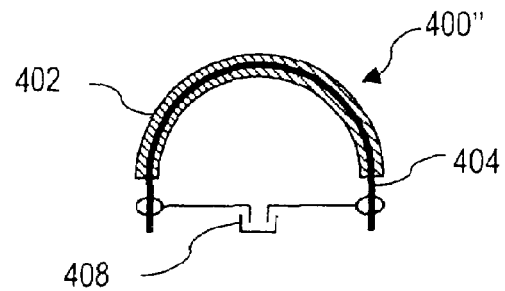
FIG. 43 is a schematic side view of a shape memory material activated release system in the form of an integral impact shell.

As shown in FIG. 43, besides being suspended, the shell 402 can also be an integral part of and surround the bent spring 404 in the device 400". The shell path in the first case is created by tension or shear (depending on shell construction) whereas the second case is created by bending.

Several type of release mechanisms can be employed with this concept. The type depends on temperature-release precision required, space availability, design flexibility, compatibility, ease of path creation etc. Different types of release mechanisms are discussed with respect to FIGS. 45-49. Additional examples of release mechanisms are described in U.S. Provisional Patent Application Ser. No. 60/191,703 which is incorporated herein by reference in its entirety.

Figure 44:
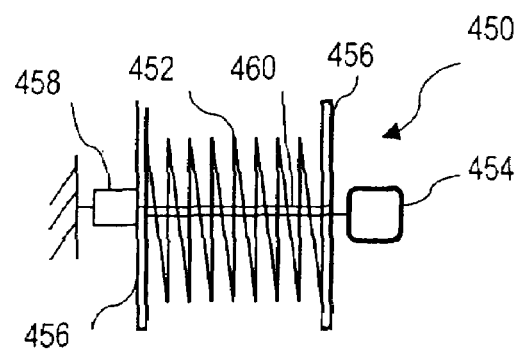
FIG. 44 is a schematic side view of another shape memory material activated release system in the form of an integral impact shell.

FIG. 44 illustrates an impact device 450 in which a compressed coil spring 452 is used to cause the shell 454 to be impacted. Impact is initiated by the release device 458 which releases the tension wire (or rod) 460 and in turn allows the spring 452 which is held under compression between two plates 456 to impact the shell 454. In a different configuration, either or both the shell and the release device can be placed inside the spring. When the shell is placed inside the spring upon impact the shell is pulled apart in tension as it is tied to both ends of the spring.

A series of concepts for release mechanisms to be used in conjunction with any of the embodiments described herein are described with reference to FIGS. 45-49. Their purpose is to release the stored mechanical energy instantaneously, produce a maximum impact on the shell and improve activation accuracy of the device. The mechanism is inserted between the shape memory material, which activates the mechanism, and the shell that receives the released energy. The incorporation of the release mechanism eliminates the slow application of force by the shape memory material itself during the martensitic to austenitic phase transformation.

FIG. 45 illustrates a release mechanism 500 which utilizes a body with two hemispherical cavities 502 that are used as sockets for ball joints 504. One ball joint, illustrated in detail in FIGS. 45B, 45C, and 45D is designed with slots such that when the slots of the cavity and the ball (cup in this case) are lined up, the joint is separated, thereby releasing the load. The line up of the cavity and the cup is achieved through the rotation of the body by two shape memory material springs 506 attached to pivoted paddles 508. The springs 506 work as a couple to rotate the body 510, as shown in FIG. 45A. The springs 506 are bent in the martensitic state and become straight in the austenitic state. During the transformation process the springs 506 rotate the body 510 and, when the slots of the cavity and the cup are lined up (FIG. 45D), the restrained spring is released. Depending on the size of the mechanism and the amount of stored energy, one shape memory material spring 506 may be utilized. The friction between the cavity and the cup must be minimized to the point that no rotation is transferred to the cup. If the cup tends to rotate, the rod attached to the cup must be integral with the cup and provisions must be made to restrain it from rotating. For clarity two slots are shown in the hemispherical cavities 502 and 504 of FIG. 45B. For optimum performance four or more slots may be incorporated.

To allow for the case where the temperature rises above $A_s$ and drops to below $A_s$ before it reaches $A_f$ and release is not achieved, a bias spring 520 attached to posts 522 is incorporated in the embodiment of FIGS. 46 and 46A. The purpose of the bias spring 520 is to return the body 510 back to its original position. This will eliminate the possibility of accidental release though impact in the case where the slots are close to the release position and the temperature drops. For this concept to work, the shape memory material should be trained to achieve a two way shape memory effect. Without the two way shape memory effect, an additional bias spring 524 integral with or connected to the shape memory material spring 506 should be used. The first bias spring rotates the body back to its original position and the second aids the return of the shape memory material to its original shape.

Figure 47:
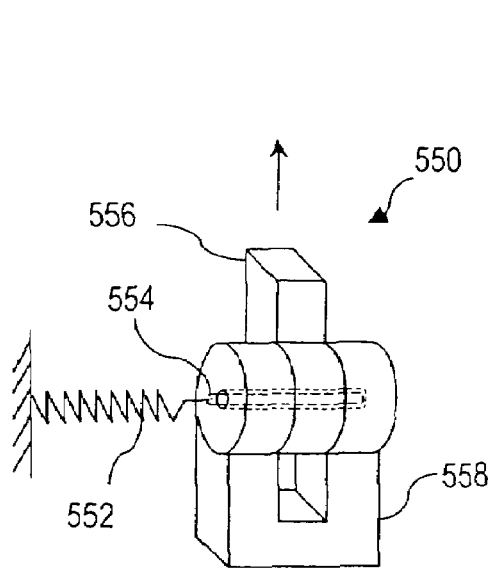
FIGS. 47 and 48 are perspective views of a pull pin release mechanism.
Figure 48:
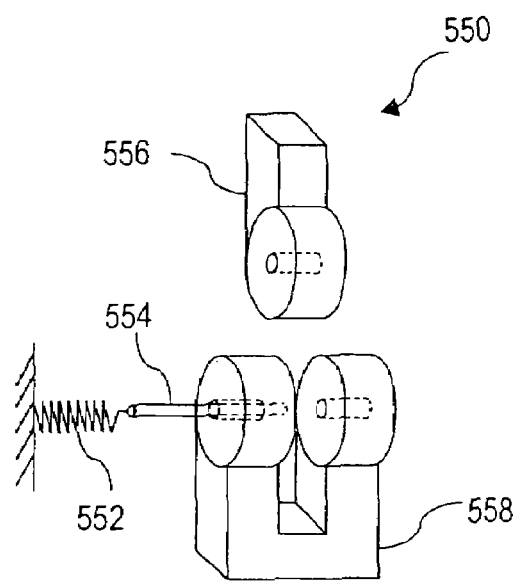

FIGS. 47 and 48 illustrate an instantaneous pin puller release mechanism 550. The pin puller 550 is used to release a single tension member. Unlike the previous release mechanisms, this one employs a shape memory material coil spring 552 to pull a pin 554 and separate two halves 556, 558. A bias coil spring can be used coaxially with the shape memory material spring 552 to return the spring to its original position when the phase transformation is incomplete and no release takes place. There is less of a need for a bias spring in this case since accidentally induced impact forces are not likely to release the hinge member. One advantage of this design is the elimination of the need to anchor the mechanism as no force couples are generated.

Figure 49:
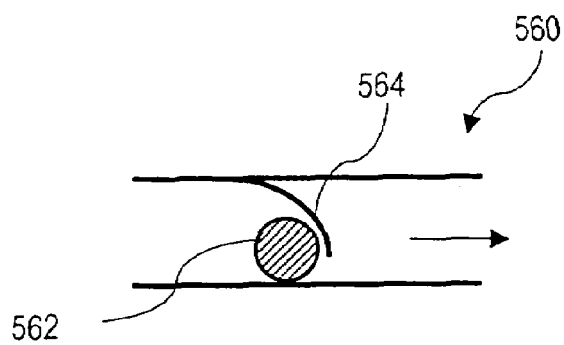
FIG. 49 is a schematic view of a force limited release mechanism.

FIG. 49 illustrates a force limited release system 560. This concept allows a shape memory material element 562 to be released when it develops a certain amount of resistance force against an object 564 such as a restraining leaf spring. As the temperature is increased above $A_s$, the shape memory material element 562 applies an increased force against the restraining spring 564 which in turn begins to deflect and creates more room for the shape memory material element to be released. By controlling the properties, shape and size of the restraining spring 564, for a given shape memory material element 562, the release temperature within the $A_s$ to $A_f$ range can be controlled. If the transformation cycle is not completed and no release takes place, the leaf spring 564 returns the shape memory material element 562 back to its original position. To aid the release process and minimize the possibility of binding, sleeves can be added to the shape memory material element such that the sleeve is in contact with the restraining spring.

When mechanisms as the ones described above that release stored mechanical energy to activate the device are used to release a drug an auditory signal is emitted the strength of which depends on factors such as material of construction and medium the signal has to travel. This property becomes significant for implants where a manual adjustment of a drug dosage can be detected with device such as a stethoscope. This provides assurance of the drug release and eliminates the uncertainty or the requirement for radiography.

Drug Delivery

The following is an explanation of some of the applications of the embodiments described herein for use in drug delivery systems. On demand drug delivery system applications are subdivided into four general categories as follows:

(1) A first application is a transdermal system that is activated by rising body temperature. In this application the patch is applied when fever is anticipated due to upcoming flu symptoms, a disease or a drug side effect etc. However, there is no need for the drug until the fever rises to a critical temperature. With this device, although the patch may be worn, the drug is not released until the critical temperature is reached. The advantage of this application is the elimination of orally administered drugs, elimination of temperature measurement, and the fact that the drug is used only if and when it is needed. More, background, information on transdermal systems is presented below.

(2) A second application involves transdermal systems used to deliver drugs but not activated by rising body temperature. In this case, the device must be activated with an external energy source when the need for the drug arises. For automatic activation the energy source has to be stored electrical energy (batteries) while for manual activation heat applied directly to the device, such as by a hot compress, will suffice. One example of this case is insulin delivered drugs.

(3) A third application involves implantable drug delivery systems. Again, for an automatic operation, a self-contained energy source is required. For manual operation an external heat source is required. In this case heat is conducted through the body to raise the temperature of the shape memory material and activate the device.

(4) A fourth application involves mixing of predetermined quantities of two or more drugs. This is a useful application when there is a need to mix two or more drugs without having to measure them. This need may arise from field work where it is not convenient to measure or when the shelf life of a drug is extended when mixing takes place at the time of application.

Electric Activation

For greater flexibility, a more accurate temperature activation system, and better time response, the shape memory material, coupled with a separate temperature sensor and the appropriate controls to activate the device, can be used as the means to generate the force to fracture the shell. Types of temperature sensors that can be used are: thermocouples, resistive temperature devices (RTDs and thermistors), IC temperature sensors etc. Irrespective of the sensor type, an energy source such as a battery will be required to provide heat to the shape memory material in order to undergo the phase transformation and create a path through the shell. With this system, means must be provided to connect the Shape memory material to the power source and electrically insulate it to avoid short circuits and energy leaks. One advantage of this system is the ability to have the temperature sensor and the enclosure placed in to two different locations, as long as they are connected together. The controls (microprocessor, solenoid, switch etc.) can be placed either inside the enclosure or outside. Because, in this case, the shape memory material is no longer the temperature sensor its $A_s$ temperature has to be higher than the activation temperature of the system in order to avoid premature activation. With an electrically activated system, activation does not have to be due to temperature. Different parameters can be used for activation. This enhances the system considerably when it is used as a drug delivery system.

Insulation

To add a time delay at temperature the shape memory material and/or the enclosure can be insulated. The level of insulation will depend on the time delay desired. This feature will delay the triggering of the device until thermal equilibrium between the shape memory material and ambient is reached. The delayed trigger will be more representative of the product temperature in the case where the device is used for temperature warning. Insulation can be in the form of a jacket similar to the insulation used for electrical wires. Space can be left between the jacket and the shape memory material to be filled with thermally insulating material to further delay the shape recovery process. In no case should the insulation impede the performance of the device.

While the invention has been described in detail with reference to the preferred embodiments thereof, it will be apparent to one skilled in the art that various changes and modifications can be made and equivalents employed, without departing from the present invention.

What is claimed is:

1. A shape memory material activated device for opening a shell containing a substance, thereby allowing the passing of a substance, the device comprising:
a shell containing a substance; and
a shape memory material activator configured to create a path through the shell in response to exposure of the shape memory material to a temperature below a predetermined temperature, wherein the passing of the substance provides a color change indication that is time and temperature dependent based upon the time the shape memory material activator has been below the predetermined temperature.

2. A device for releasing a substance to a reservoir, the device comprising:
- a shell, said shell having an imperforate wall that encapsulates and contains a first substance;
- a reservoir containing a second substance and being in close proximity to said shell wall; and
- a shape memory material activator configured to create a path through said shell wall when the shape memory material activator attains a predetermined temperature, to release the first substance into the reservoir to contact the second substance, wherein the release of the first substance is repeatable with the temperature cycling of the shape memory material.

3. A shape memory material activated temperature sensor for controlling the passing rate of a substance, the sensor comprising:
- an inner shell comprising a permeable wall for controlling the passing of a substance capable of providing a visual indication;
- an outer shell configured to seal the permeable wall of the inner shell; and
- a shape memory material activator for controlling the opening and closing of the outer shell,
- wherein the passing rate of the substance produces a cumulative visual record.

4. A shape memory material activated temperature device, the device comprising:
- a shape memory material activator; and
- an enclosure, said enclosure including a first substance and a shell, said shell having an imperforate wall that encapsulates and contains a second substance,
- wherein the shape memory material activator is located outside the enclosure and is configured to act on the enclosure to indirectly create a path through the shell wall, thereby allowing the first and second substances to contact each other.

5. The device according to claim 4, wherein one substance is capable of changing the color of the other substance.

6. The device according to claim 4, wherein the path in the shell is created in response to the shape memory material attaining a predetermined temperature.

7. A remote temperature sensor, the sensor comprising:
- an enclosure containing a substance, said enclosure further including a window defining an indicating surface and a shape memory material temperature detection mechanism for sensing a remote temperature, the window and detection mechanism being spaced apart within the enclosure,
- wherein the temperature sensed by the shape memory material temperature detection mechanism is depicted by the indicating surface as a color change of the enclosure substance.

8. A remote temperature sensor, the sensor comprising:
- an enclosure containing a substance, said enclosure further including a first chamber having an indicating surface, a second chamber spaced from the first chamber and containing a shape memory material temperature detection mechanism for sensing a remote temperature; and
- a conduit connecting the first and second chambers,
- wherein the temperature sensed by the share memory material temperature detection mechanism is depicted by the indicating surface as a color change of the enclosure substance and is a cumulative indication of the temperature and time history sensed by the detection mechanism.

9. A shape memory material activated temperature device, the device comprising:
- a shape memory material activator; and
- an enclosure, said enclosure including a first substance and a shell, said shell having an imperforate wall that encapsulates and contains a second substance,
- wherein the shape memory material activator pressurizes the enclosure and is configured to act on the enclosure to indirectly create a path through the shell wall, thereby allowing the first and second substances to contact each other.

10. The device according to claim 9, wherein one substance is capable of changing the color of the other substance.

11. The device according to claim 9, wherein the path in the shell is created in response to the shape memory material attaining a predetermined temperature.

12. The device of claim 9, wherein the shape memory material is located within the enclosure.

* * * * *